US005493426A

United States Patent [19]
Johnson et al.

[11] Patent Number: 5,493,426
[45] Date of Patent: Feb. 20, 1996

[54] LATERAL ELECTRODE SMECTIC LIQUID CRYSTAL DEVICES

[75] Inventors: Kristina M. Johnson; Anat Sneh; Jian-Yu Liu; Gary D. Sharp, all of Boulder, Colo.

[73] Assignee: University of Colorado Foundation, Inc., Boulder, Colo.

[21] Appl. No.: 56,415

[22] Filed: May 3, 1993

Related U.S. Application Data

[63] Continuation-in-part of Ser. No. 792,284, Nov. 14, 1991, Pat. No. 5,381,253.

[51] Int. Cl.$^6$ .................. G02F 1/1335; G02F 1/133; G02F 1/1337; G02F 1/13
[52] U.S. Cl. ................. 359/40; 359/42; 359/53; 359/77; 359/87; 359/100
[58] Field of Search ................ 359/40, 42, 53, 359/77, 87, 89, 93, 100

[56] References Cited

U.S. PATENT DOCUMENTS

| 4,367,924 | 1/1983  | Clark et al. ............... | 359/100 |
| 4,779,959 | 10/1988 | Saunders .................. | 359/77  |
| 4,813,771 | 3/1989  | Handschy et al. ........ | 359/42  |
| 4,836,657 | 6/1989  | Gunji et al. .............. | 359/87  |
| 4,840,461 | 6/1989  | Winter et al. ............. | 359/77  |
| 4,896,945 | 1/1990  | Ooba et al. ............... | 359/87  |
| 5,011,267 | 5/1991  | Miller et al. ............. | 350/340 |
| 5,111,321 | 5/1992  | Patel ........................ | 359/92  |
| 5,150,236 | 9/1992  | Patel ........................ | 359/71  |
| 5,182,665 | 1/1993  | O'Callaghan et al. .... | 359/95  |
| 5,313,562 | 5/1994  | Wiltshire .................. | 359/77  |

OTHER PUBLICATIONS

M. Ozaki et al., "Electrooptic Effect in Homeotropically Aligned Ferroelectric Liquid Crystal", *J. App. Physics*, No. 9B, Sep. 1991, pp. 2366–2368.

S. S. Bawa et al., "Novel alignment technique for surface stabilized ferroelectric liquid crystal", *Appl. Phys. Lett.* 57(14), 1 Oct. 1990, pp. 1398–1400.

Z. M. Brodzeli et al., "Optical Response of Homeotropically Aligned Ferroelectric Liquid Crystal", *Technical Digest on SLM' and Their Applications* (1990) 14:128–131.

T. P. Rieker et al., "Layer and director structure in surface stabilized ferroelectric liquid crystal cells with non-planar boundary conditions", *Liquid Crystals*, 1989, vol. 6, No. 5, pp. 565–576.

M. Kuwahara et al., "A method for Molecular Alignment of Ferroelectric Smetic Liquid Crystal: Combination of Metal Oxide Thin Film and Electric Field", *Jpn. J. Appl. Phys.*, vol. 27, No. 8, Aug. 1988, pp. 1365–1372.

S. Garoff and R. B. Meyer, "Electroclinic effect at the A–C phase change in a chiral smectic liquid crystal", *Physical Review A*. vol. 19, No. 1, Jan. 1979, pp. 338–347.

S. Garoff and R. B. Meyer, "Electroclinic Effect at the A–C Phase Change in a Chiral Smectic Liquid Crystal", *Physical Review Letters*, vol. 38, No. 15, Apr. 1977, pp. 848–851.

*Primary Examiner*—William L. Sikes
*Assistant Examiner*—Ron Trice
*Attorney, Agent, or Firm*—Greenlee and Winner

[57] ABSTRACT

This invention provides smectic liquid crystal cells with lateral electrodes. The effective change in refractive index with field-induced tilting of the liquid crystal molecules is increased by providing an angle between the direction of propagation of light and the direction of the molecular directors at zero applied field. For homeotropically aligned liquid crystals this is accomplished by inclining the incident light beam at an oblique angle to the device surface. For tilted layer cells the liquid crystal layers are tilted and the light can impinge at normal incidence. This invention further provides Fabry-Perot filters utilizing lateral electrode liquid crystal cells.

86 Claims, 14 Drawing Sheets

LATERAL ELECTRODE SMECTIC LIQUID CRYSTAL DEVICES

This invention was made with Government support under contract EID-9024211 awarded by the National Science Foundation. The Government has certain rights in this invention. This application is a continuation-in-part and divisional of U.S. patent application Ser No. 07/792,284, filed Nov. 14, 1991, now U.S. Pat. No. 5,381,253 which is incorporated by reference herein.

FIELD OF THE INVENTION

This invention relates to phase, polarization, wavelength, complex amplitude, and intensity modulation by homeotropically aligned and tilted layer aligned smectic liquid crystal cells with lateral electrodes and by lateral electrode cells in a Fabry-Perot cavity.

BACKGROUND OF THE INVENTION

Light modulation with nematic liquid crystals is a mature technology offering a host of applications including displays, spatial light modulators, and tunable filters. These devices feature large modulation depth, good contrast ratio, low cost and ion power dissipation. One major disadvantage of nematic liquid crystals which sets a limit to the applicability of this technology is their low switching speed, in the range of milliseconds.

A more recent technology, utilizing the smectic C, phase (SmC*), surface-stabilized ferroelectric liquid crystals (SSFLCs), is now increasingly entering the field of application, offering orders of magnitude faster switching (~microseconds) and bistability. This class of devices is not capable of performing analog intensity or analog phase modulation in a simple straightforward configuration. Recently the ferroelectric effect has also been observed in non-chiral liquid crystals.

Another member of the chiral smectic liquid crystal (CSLC) family is the non-tilted smectic A* phase (SmA*). Although in general the SmA, phase possesses no spontaneous polarization, under the influence of an applied electric field a molecular tilt is induced in nearly linear proportion to the applied electric field. This field-induced tilt is called the electroclinic effect. Compared to SSFLC devices, electroclinic CSLCs have gray scale capability and higher modulation speed. The tilt angle induced by the electroclinic effect is smaller than that obtained with SSFLC devices; however, it is quite a considerable one, presently achieving maximum values of 15°–20°.

Early investigations on the electroclinic effect were done using homeotropic alignment (S. Garoff and R. B. Meyer, Phys.Rev. Lett. 38, 848 (1977); S. Garoff and R. B. Meyer, Phys.Rev. A. 19, 338 (1979)). In the homeotropic alignment of CSLCs, the smectic layers are formed parallel to the confining glass plates. In order to manipulate the molecular director in the homeotropic alignment geometry, an electric field needs to be applied in a transverse direction, i.e., parallel to the substrate walls. This induces a molecular tilt in a plane which is perpendicular to the field direction. In their experiment, Garoff and Meyer detected the relative time delay between the electroclinic response of a sample and the modulating electric field signal which was applied to it. Using this measurement, in conjunction with the amplitude measurement of the electroclinic response, they were able to study the critical behavior at the smectic A*smectic C* phase transition. However, molecular tilt angles of the electroclinic effect in the homeotropic alignment were not presented in this work.

Further studies on the electro-optic properties of the electroclinic effect were performed in the surface-stabilized parallel aligned geometry (G. Andersson, I. Dahl, P. Keller, W. Kuczynski, S. T. Lagerwall, et al.) Appl. Phys. Lett. 51, 640 (1987); G. Andersson et al., Ferroelectrics 84, 285 (1988)). With this geometry it was easier to detect the electroclinic effect and tilt angles of about 6° were measured. For the parallel alignment, also known as the homogeneous alignment, the planar alignment and the bookshelf alignment, the smectic layers are oriented perpendicular to the plates. The electrodes are in the plane of the plates sandwiched around the liquid crystal. An electric field is applied perpendicular to the substrates and the liquid crystal molecules rotate in the plane of the substrates. Rotation in the plane of the substrates provides analog variability of the orientation but not the magnitude of the retardance.

Tristable switching of a planar-aligned CSLC cell has been reported (I. Nishiyama et al. (1989) Jpn. J. App. Phy. 28:L2248; and A. D. I. Chandani et al. (1988) Jpn. J. App. Phy. 27:L729). The observed switching has a DC threshold and a hysteresis of the threshold voltage. The third state of such tristable cells has been linked with the presence of an antiferroelectric phase, designated SmCA*. This type of CSLC cell has been designated an antiferroelectric liquid crystal cell. The antiferroelectric phase can, for example, be generated in a SmC* material by application of an AC field across the planar-aligned liquid crystal.

A new type of chiral smectic ferroelectric liquid crystal cell called the distorted helix ferroelectric (DHF) liquid crystal cell has been described by L. A. Beresnev et al., European Patent Application No. 309774, published 1989. This type of device is similar to the planar-aligned chiral SmA* device of Andersson et al., except that it is not strongly surface-stabilized, so that the helix along the direction of the layer normal, $\hat{z}$, is not suppressed. When the pitch of the helix (defined as the distance between identical orientations of $\hat{n}$ along the helix) is much shorter than the wavelength or wavelengths of light incident upon the device, light traversing the material sees an index of refraction given by the average orientation of the molecular directors. Application of an electric field to the DHF cell partially orients the molecular directors by an angle $\Psi$ to $\hat{z}$. The angle $\Psi$ is dependent on the size and magnitude of the field so the DHF device operates in an analog mode similar to a SmA, device. In a DHF device there is a change in the birefringence of the material as the molecules align, which does not occur in either the SSFLC SmC* or planar-aligned SmA* device. The DHF materials, such as Hoffmann-La Roche DHF 6300, having $\Psi_{MAX}$ as large as ±37° have been described. An interesting feature of DHF devices is the coupling of the change in birefringence with the rotation of the optic axis as a function of applied voltage.

Tilted smectic layer structures can be prepared in which the smectic layers are at an oblique angle to the substrate surface (S. S. Bawa et al., Appl. Phys. Lett. 57, 1398 (1990) and M. Kuwahara et al., Jpn. J. Appl. Phys. 27, 1365 (1988)). This technique is used for reducing defects in the bookshelf geometry of surface stabilized ferroelectric liquid crystal devices, in order to achieve improved properties such as higher bistability and contrast ratio. It is also used for improved alignment of nematic liquid crystals.

Fabry-Perot resonators fold the optical path within an electro-optic material and produce intensity, wavelength, and phase modulation. This technique relies on interference of waves within the cavity. By virtue of the nonlinear intensity transmission function of the Fabry-Perot resonator, a small induced phase change in the cavity produces a large intensity or wavelength modulation. Tuning the wavelengths that the filter transmits can be achieved by tuning the cavity length or the index of refraction of the cavity material. Mechanical tuning of the cavity length has been achieved by applying electric fields to piezoelectric materials, which typically have response times on the order of a few milliseconds. Index of refraction tuning has been demonstrated in liquid crystals by using nematic liquid crystals. The response time of this type of device is also on the order of milliseconds. As shown in U.S. patent application Ser. No. 07/792, 284, filed Nov. 14, 1991, Fabry-Perot modulators can utilize smectic liquid crystal cells to produce phase, intensity and wavelength modulation. However, analog wavelength modulation can not be produced by a single surface-stabilized parallel aligned cell.

SUMMARY OF THE INVENTION

This invention provides homeotropically aligned and tilted layer aligned smectic liquid crystal cells with lateral electrodes, and lateral electrode cells in Fabry-Perot filters. The lateral electrode cells provide phase and polarization modulation. In combination with an analyzing polarizer they produce intensity modulation. Disposed within a Fabry-Perot cavity they produce phase, intensity and wavelength modulation. The Fabry-Perot tunable filter of this invention can provide high speed analog wavelength tuning.

Application of an electric field parallel to the cell walls by lateral electrodes rotates the liquid crystal molecules and thereby changes the refractive index of the cell. In this invention, the effective change in refractive index with field-induced tilting of the liquid crystal molecules is increased by providing an oblique angle between the polarization vector of incident light the direction of the molecular directors at zero applied field. For homeotropically aligned liquid crystals this is accomplished by inclining the incident light beam at an oblique angle to the device surface. For the tilted layer cells of this invention the light can impinge at normal incidence and the liquid crystal layers themselves are tilted.

The homeotropically aligned lateral electrode cells of this invention provide pure phase modulation of linearly polarized light incident normal to or at an oblique angle to the surface normal. To achieve pure phase modulation, the polarization of the incident light must be parallel to the plane of field-induced rotation of the liquid crystal molecular directors. For other orientations of the polarization of incident light, both the polarization and phase are modulated. Pure analog phase modulation, provided in this invention, can not be achieved by surface stabilized parallel aligned liquid crystal cells.

For pure phase modulation of elliptically polarized light, two of the homeotropically aligned lateral electrode cells of this invention can be stacked together. The directions of the applied fields in the two cells, and thus the planes of field-induced rotation, are orthogonal. Each cell modulates the phase of the component of light polarization which is parallel to the plane of field-induced rotation of that cell. When the two cells have equal retardance, this provides a polarization insensitive phase modulator. The light can impinge upon the device at at normal or oblique incidence.

This invention also provides tilted layer liquid crystal lateral electrode cells. These cells have smectic layers tilted at an oblique angle with respect to the substrate, as contrasted with evaporated $SiO_x$. The tilted layer cell of this invention can be homeotropically or parallel aligned cells. Tilted alignment can be achieved with suitable alignment layers, for example obliquely used with any polarization of light and with normal or oblique incidence. This device functions as a variable retarder. Pure phase modulation is achieved when the polarization of the incident light is parallel to the plane of field-induced rotation of the liquid crystal molecules.

Both the homeotropically aligned and the tilted layer aligned cells of this invention can employ a variety of smectic liquid crystals, including SmA*, SmC*, DHF, achiral ferroelectric, and antiferroelectric materials. The oblique incidence and tilted layer alignment are particularly advantageous for the SmA* phase because they increase the change in refractive index achieved with the modest tilt angles available.

In both the homeotropically and tilted layer aligned cells of this invention, the light can also enter the cell from the edge, between both the substrates and the electrodes. For pure phase modulation the polarization of the incident light is parallel to the plane of molecular rotation. In another embodiment of this invention, light enters from the edge between the electrode-coated substrates of a planar aligned cell with an electric field applied perpendicular to the substrates.

The homeotropic and tilted layer aligned cells of this invention can be placed in a Fabry-Perot resonance cavity to produce tunable wavelength filters and phase and amplitude modulators. For polychromatic light tuning the wavelength that the filter transmits can be achieved by tuning the index of refraction of the cavity material. For monochromatic light, the Fabry-Perot device is a variable amplitude modulator. In reflection-only mode the Fabry-Perot device is a phase modulator. Smectic A* and DHF cells provide analog modulation, SmC* cells are binary modulators, and antiferroelectric cells are ternary modulators.

Multiple pixel devices utilizing the lateral electrode cells of this invention either with or without Fabry-Perot resonance cavities are an aspect of this invention. In addition, both the lateral electrode cells and the Fabry-Perot filters can include a photo-sensor for optical addressing.

This invention further provides for polarization diversity embodiments of the lateral electrode cells and the Fabry-Perot modulators. The incoming light beam is split into two components with orthogonal polarizations. These components are spatially separated into two regions of the liquid crystal cell or two cells with orthogonal orientations of the applied electric field. This provides equal retardance for both polarizations. The beams can then be recombined or can be used separately.

The lateral electrode cells of this invention offer several advantages over parallel aligned cells with sandwich electrodes. Analog modulation of the refractive index is provided in the homeotropically aligned and tilted layer cells of this invention, as contrasted with the parallel aligned cells which can provide analog modulation of the orientation but not the magnitude of the retardance. Because the electrodes are in the lateral position, transmission losses through the electrodes are avoided. This is particularly significant in the Fabry-Perot resonator. Also, because the electrodes are in the lateral position, they do not add to the cell thickness and higher free spectral range Fabry-Perot filters can be constructed. The alignments used in this invention are more easily fabricated, less prone to defects, and can have film thicknesses greater than the parallel aligned cells.

DETAILED DESCRIPTION OF THE PREFERRED EMBODIMENTS

Figure 1:
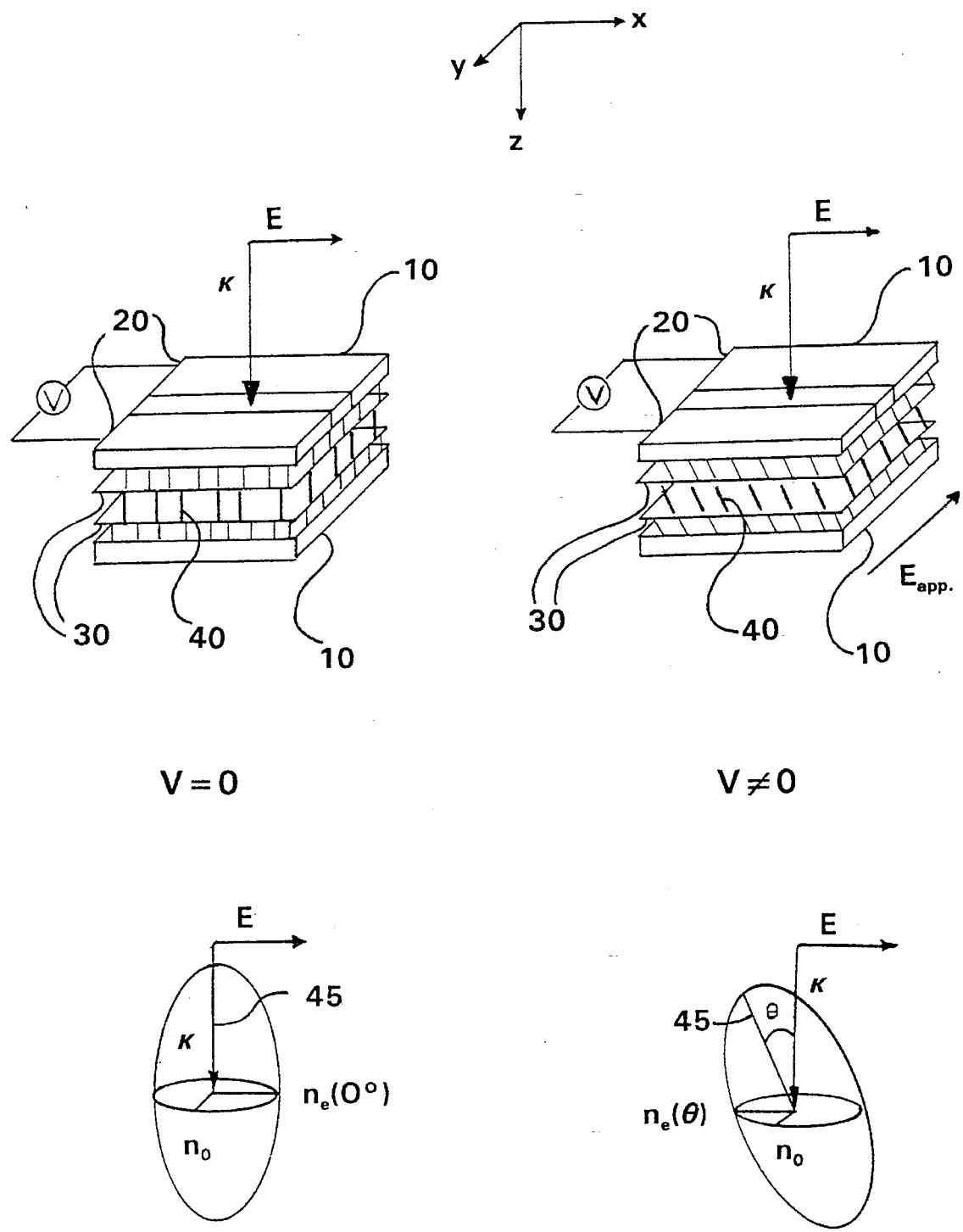
FIG. 1 is a homeotropically aligned lateral electrode cell shown at zero voltage and with an applied field. The index ellipsoid is also illustrated.

The smectic liquid crystal phase modulators of this invention utilize the ability of liquid crystal molecules to tilt in response to an applied electric field. In SmA* liquid crystals the molecular tilt angle is an approximately linear function of the applied electric field and thus such molecules can provide analog modulation. The functional dependence of tilt angle on applied electric field is temperature dependent. If the liquid crystal molecules are aligned such that their molecular rotation changes the angle between the polarization vector of an incident beam and the liquid crystal molecular director, then modulation is achieved via the liquid crystal index of refraction modulation.

Referring now to the drawings, like numbers indicate like features and the same number appearing in more than one drawing refers to the same feature.

Refractive index modulation is illustrated in FIG. 1 which shows a SmA* homeotropically aligned liquid crystal cell. The cell comprises substrates 10 and liquid crystal molecules 40 aligned in smectic layers 30. In this embodiment, an electric field in the y direction is provided by the fringing field of lateral electrodes 20. In the homeotropic alignment, the long axis 45 of the liquid crystal molecules, representing the molecular director, is perpendicular to the confining substrates at zero field. An alignment layer, not shown, can be used to achieve homeotropic alignment. The molecular long axis direction is also the direction of the optic axis.

In FIG. 1, at zero field the optic axis and the incident light are parallel. As an electric field is applied in the y-direction, the molecules tilt in the xz plane, producing an angle $\theta$ between the incident optical beam and the optic axis, and an angle $(90°-\theta)$ between the polarization vector and the optic axis. This results in a modulation of the extraordinary index of refraction $n_e(\theta)$. In the pure phase modulator of this invention, the polarization vector of the incident light is parallel to the plane containing the molecular rotation and the substrate normal (the xz plane) so that it generates a single eigenmode in the liquid crystal. At other orientations of the incident polarization, both eigenmodes in this uniaxial crystal are excited and coupling between the extraordinary and ordinary propagation modes results in modulation of both the polarization and phase of the light.

Figure 2:
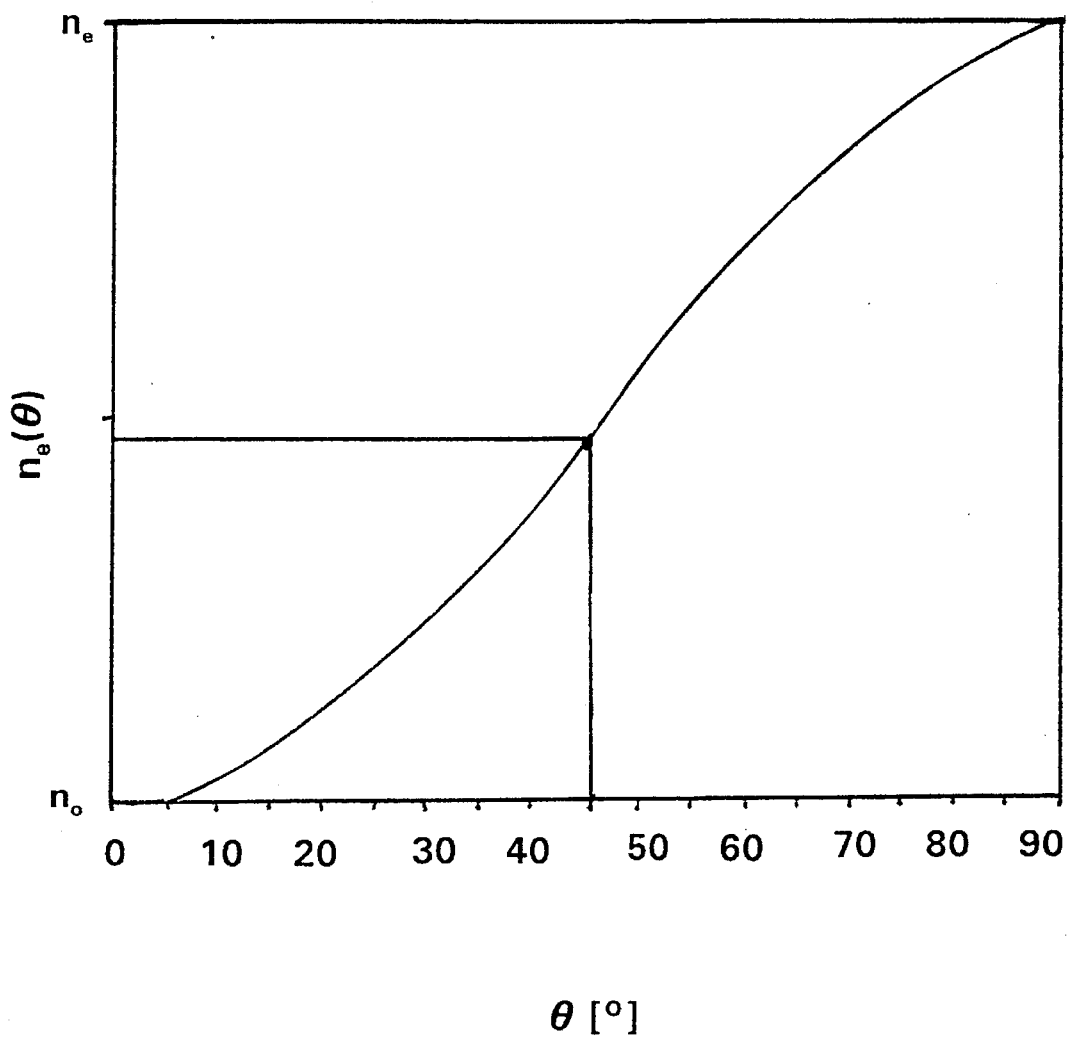
FIG. 2 shows the extraordinary refractive index of a liquid crystal molecule as a function of the angle between the optic axis and the light propagation direction.

Using the known dependence of the extraordinary index of refraction on the angle $\theta$ between the optic axis and an incident beam:

$$n_e(\theta) = \left( \frac{\sin^2(\theta)}{n_e^2} + \frac{\cos^2(\theta)}{n_o^2} \right)^{-1/2} \qquad \text{Eq. 1}$$

where $n_o$ is the ordinary index of refraction and $n_e$ is the extraordinary index of refraction for $\theta=0°$, the extraordinary index of refraction modulation due to the change in $\theta$ is calculated. As seen in FIG. 2, the change in the index of refraction with $\theta$ is at its minimum at $\theta=0°$ and reaches a maximum for $\theta=45°$. Thus for maximum modulation of light, $\theta_0=45°$ where $\theta_0$ is $\theta$ at zero applied field. Note that for molecules with maximum tilt angles of 10°–15°, operation with $\theta_0$ in the range of about 30°–60° gives near optimum modulation of $n_e(\theta)$.

For light at normal incidence the phase modulation depth $\Delta\phi$, is determined by the operating wavelength $\lambda$ and the thickness d of the liquid crystal layer, according to the following equation:

$$\Delta\phi = \frac{2\pi d \Delta n}{\lambda} \qquad \text{Eq. 2}$$

where $\Delta n = (n_e)_{final} - (n_e)_{initial}$

The modulation depth also depends on the liquid crystal birefringent and electroclinic properties. Currently available commercial electroclinic materials have a birefringence ranging from 0.15–0.2 and are capable of tilting by 10°–15°. For example, the British Drug House mixtures BDH764E, 854E, 868E, 869E, 870E are available from Merck Ltd., Poole, England. This gives a modulation depth ranging between 0.06–0.1 when operating around the optimum operation point of $\theta=45°$. A thickness of about 4 μm would be required to achieve a $\pi$ phase change for $\lambda=0.5$ μm, and $\Delta n=0.06$.

Figure 3A:
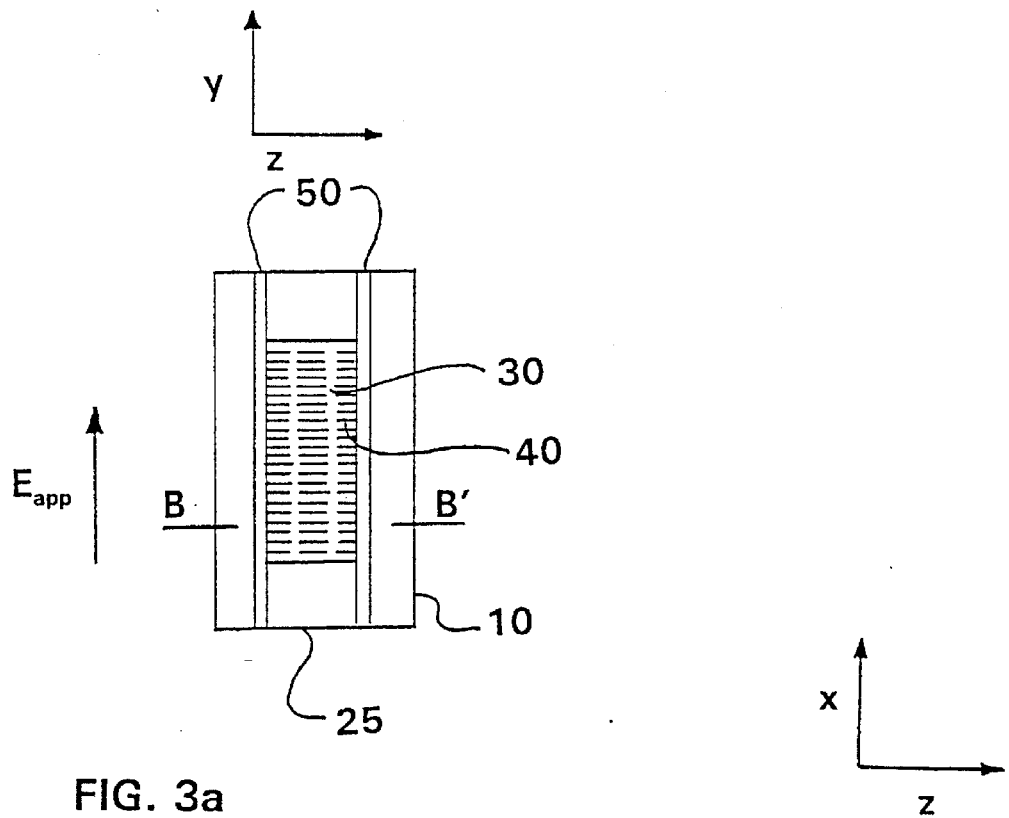
FIG. 3a is a homeotropically aligned lateral electrode cell shown in cross section through the electrodes.
Figure 4:
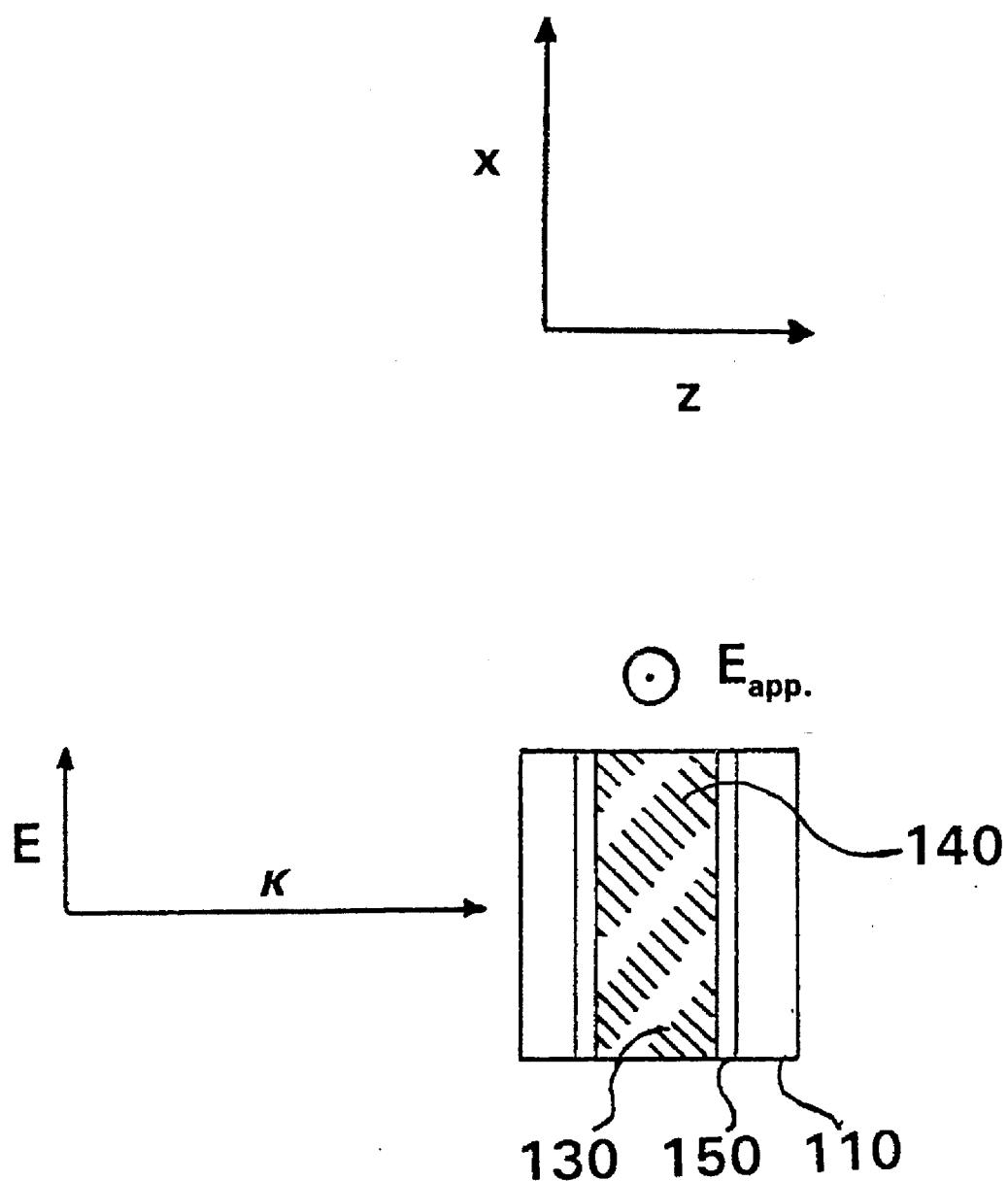
FIG. 4 is a tilted layer aligned lateral electrode cell.

In order to shift the operation to this optimum position, two different techniques are employed in this invention, the oblique incidence homeotropic cell (FIG. 3a,b) and the tilted layer cell (FIG. 4). In the homeotropically aligned structure, the desired angle between the polarization vector and the liquid crystal optic axis is achieved by oblique incidence of the optical beam. In this configuration, the liquid crystal molecules are aligned perpendicular to the glass substrates and the substrates are tilted with respect to the incident beam.

Figure 3B:
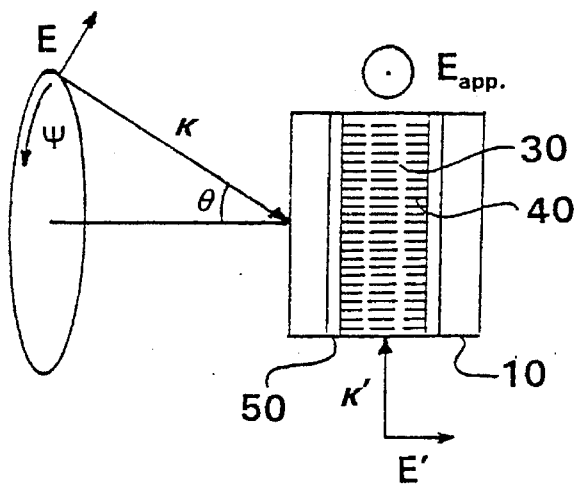
FIG. 3b is a cross-section of the same cell parallel to the electrodes.

The homeotropic device is shown in FIG. 3a,b. The cell comprises substrates 10 and liquid crystal molecules 40 in homeotropic layers 30. Homeotropic alignment is achieved by use of alignment layers 50. An electric field is applied with lateral electrodes 25. FIG. 3a is a cross section in the yz plane which shows the lateral electrodes but not the obliquely incident light. FIG. 3b is a cross section in the xz plane, which is the plane containing the molecular rotation and the substrate normal. The optical beam is incident at angle θ. To achieve pure phase modulation, the polarization vector of the incident light is in the xz plane. Any azimuthal angle Ψ can be employed provided that the polarization is in the xz plane.

An exemplary embodiment of this device was prepared on two optically flat glass plates. A metal layer of 2.6 μm thickness was deposited on one of the plates and then etched away to form an 18 μm wide channel. The metal layer acts both as electrodes and spacers, allowing for an electric field to be applied parallel to the glass plates. The homeotropic alignment was achieved by using CTAB (cetyl trimethyl ammonium bromide) surfactant. The liquid crystal used in this device is a commercially available electroclinic mixture, BDH764E, which undergoes the following phase transitions:

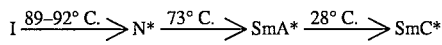

In order to measure the enhancement of Δn with oblique incidence, the device was oriented with the plane of molecular rotation at 45° to the direction of incident optical polarization so that both phase and polarization were modulated. An entrance and crossed analyzing polarizer produced intensity modulation as a function of induced molecular tilt angle. The measurements were performed by applying DC fields of up to 15 V/μm for short durations (few seconds long), and monitoring the output intensity modulation. The intensity readings were taken with an avalanche photodiode and a lock-in amplifier. The sample temperature was controlled to different levels with 0.1° C. stability and the accuracy of the temperature readings was within 0.5° C.

The intensity as a function of applied DC field was measured around different angles of incidence. The modulation depth increased with the angle of incidence in accordance with Eqs. 1 and 2. The molecular tilt values were calculated from the measured intensity changes. The calculated tilt values obtained at two different incidence angles matched each other with an accuracy well within the measurement error of approximately ±0.3°, thereby confirming the applicability of Eqs. 1 and 2.

Figure 5:
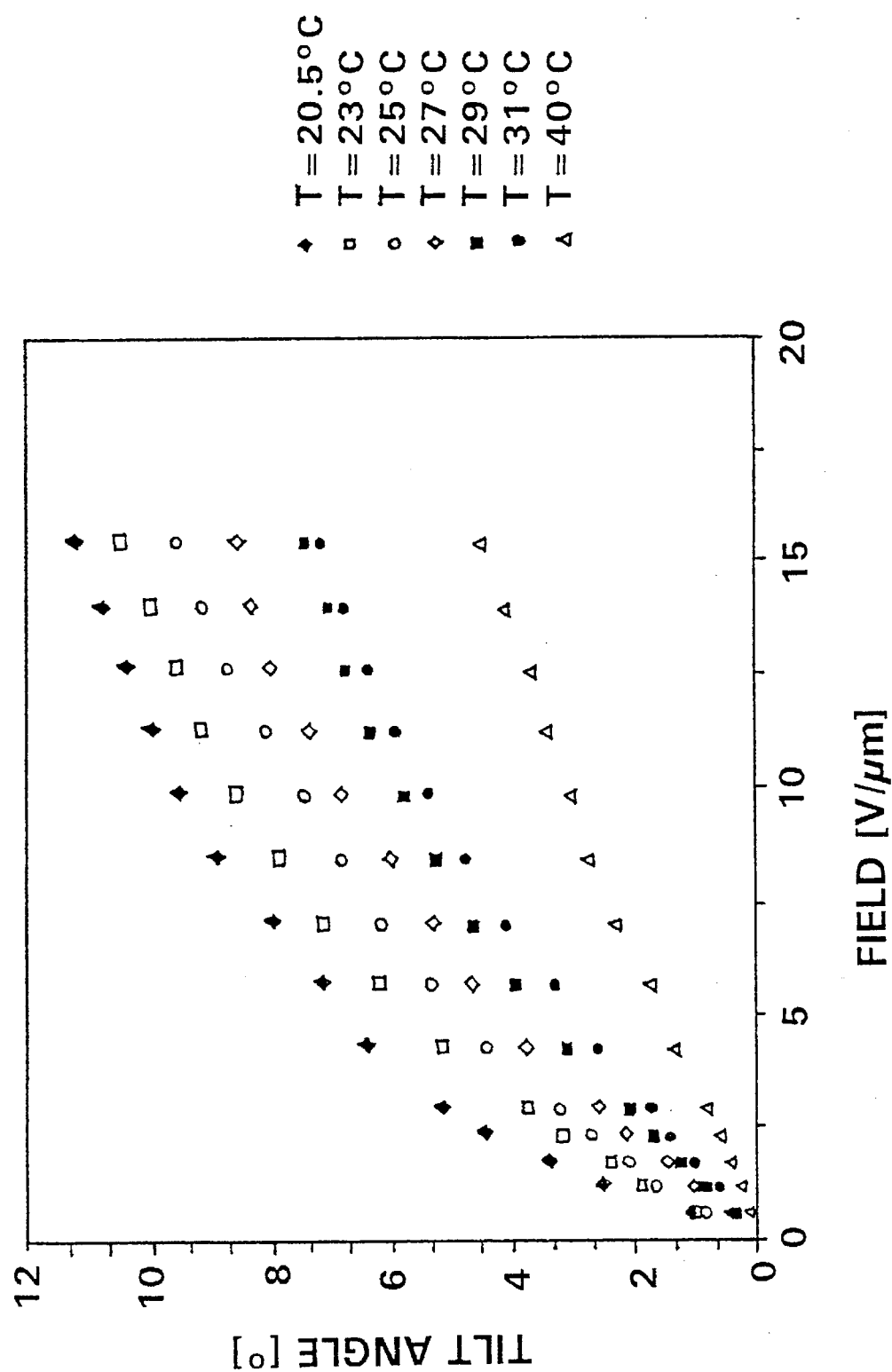
FIG. 5 shows the field-induced molecular tilt angle of a SmA* homeotropically aligned lateral electrode cell as a function of applied electric field at various temperatures.

The molecular tilt angle as a function of applied field for oblique incidence from air of 40° is shown in FIG. 5. At a temperature of 2920 just above the A*-C* transition temperature, 15 V/μm produced a 7° tilt. Using the BDH764E index of refraction values, this corresponds to an index of refraction modulation of about 0.03. In this device λ=0.633 μm and d is about 2.6 μm. Thus, by Eq. 2, the phase modulation depth is 40°. A device thickness of about 11.5 μm would be required to obtain a π phase change in these conditions.

Comparing these measured molecular tilt angles to the tilt angles obtained at the same conditions (i.e., temperature and electric field) with parallel aligned surface-stabilized BDH764E cells shows a smaller electroclinic effect in the homeotropic alignment case. The discrepancy is reduced as the temperature is increased further away from the A*-C* transition. This may be due to the different distribution of the surface anchoring forces relative to the smectic layer direction in the homeotropic alignment. However, it may also result from hydrodynamic flow that was observed during the application of the higher electric field values.

Figure 6:
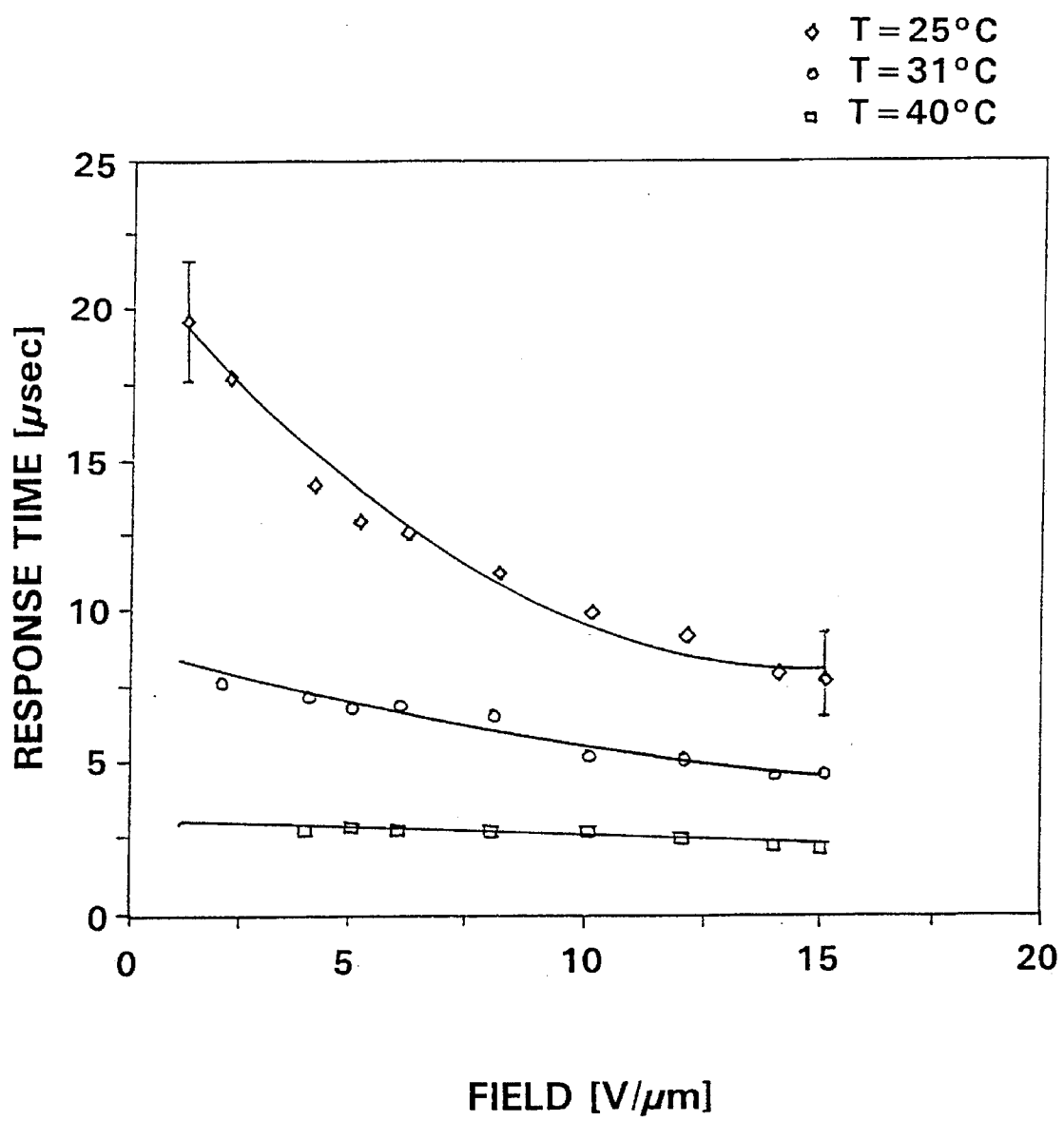
FIG. 6 shows the optical response rise time of a SmA* homeotropically aligned lateral electrode cell as a function of applied electric field at various temperatures.

The switching characteristics of the homeotropically aligned electroclinic device were measured by applying an AC electric field at a 1 kH frequency. The 10% to 90% response times to the electric field are shown as a function of applied field in FIG. 6. The field dependence decreases as the temperature is increased to the more linear regime of the electroclinic effect. The switching speed with the homeotropic alignment is faster than that obtained with surface stabilized smectic liquid crystals under the same conditions, possibly due to the weaker anchoring of the molecules to the glass surfaces. However, it is difficult to quantitatively compare the switching speed of the two alignment configurations, as the field dependence at a given temperature is different from one alignment to the other. Another reason lies in the fact that in the surface stabilized parallel alignment configuration, the switching speed depends largely on the type of surfactant used to align the molecules. For example, parallel alignment using rubbed nylon 6 produces switching times which are roughly 2–3 times slower than those obtained with the homeotropic alignment (A. B. Davey and W. A. Crossland, Ferroelectrics 114, 101 (1991)).

Lateral electrodes are positioned on opposite edges of a cell to provide an electric field parallel to the substrate. The functional optical criterion for lateral electrodes is that they are positioned on either side of the light propagation axis. For light incident on a substrate this is achieved as shown in FIG. 3a and the applied electric field is parallel to the substrates. The device of FIG. 3a,b is also a variable retarder for light entering the cell from the edge between the substrates with propagation vector k' and polarization E', as shown in FIG. 3b. The light can also enter the edge at an oblique angle. For pure phase modulation, E' must be in the xz plane, the plane of molecular rotation.

Figure 3C:
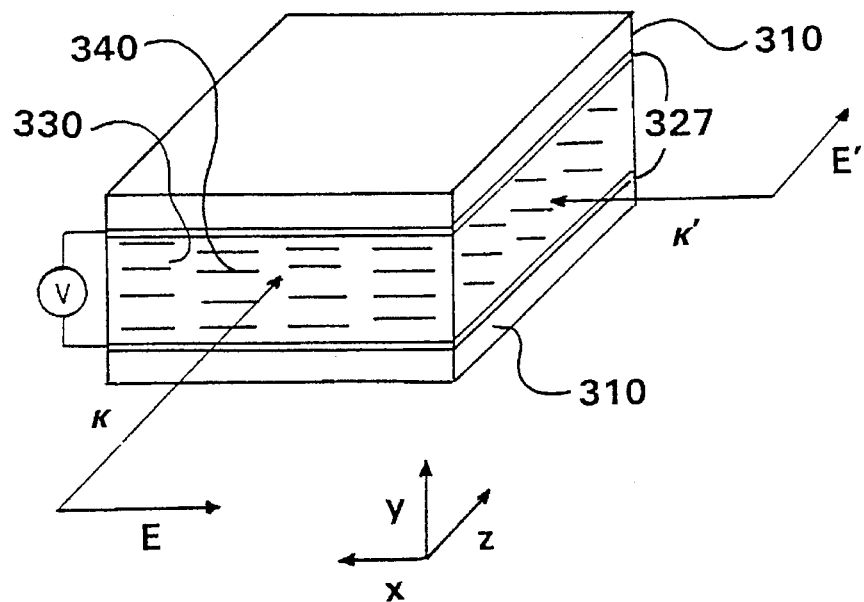
FIG. 3c is a planar aligned cell with light incident from the edge.

In another embodiment of this invention, light enters the cell between the substrates and the field is applied perpendicular to the substrates, as shown in FIG. 3c. Substrates 310 are coated with electrodes 327 which provide an electric field in the y direction. Liquid crystals 340 are formed in parallel aligned smectic layers 330. In the illustrated embodiment, the light can propagate in the z direction with polarization in the x direction or in the x direction with polarization in the z direction. The electrodes are lateral with respect to the light propagation. The light can also be incident at an oblique angle. For pure phase modulation the polarization vector is in the plane of the molecular rotation, the xz plane. Two edge-entering cells can be used in series for a polarization diversity phase modulator. For light propagating in the z direction, the second cell has lateral electrodes which provide an electric field parallel to the substrates in the x direction, and the molecules are homeotropically aligned such that they rotate in the yz plane and modulate the y polarization component.

Figure 7:
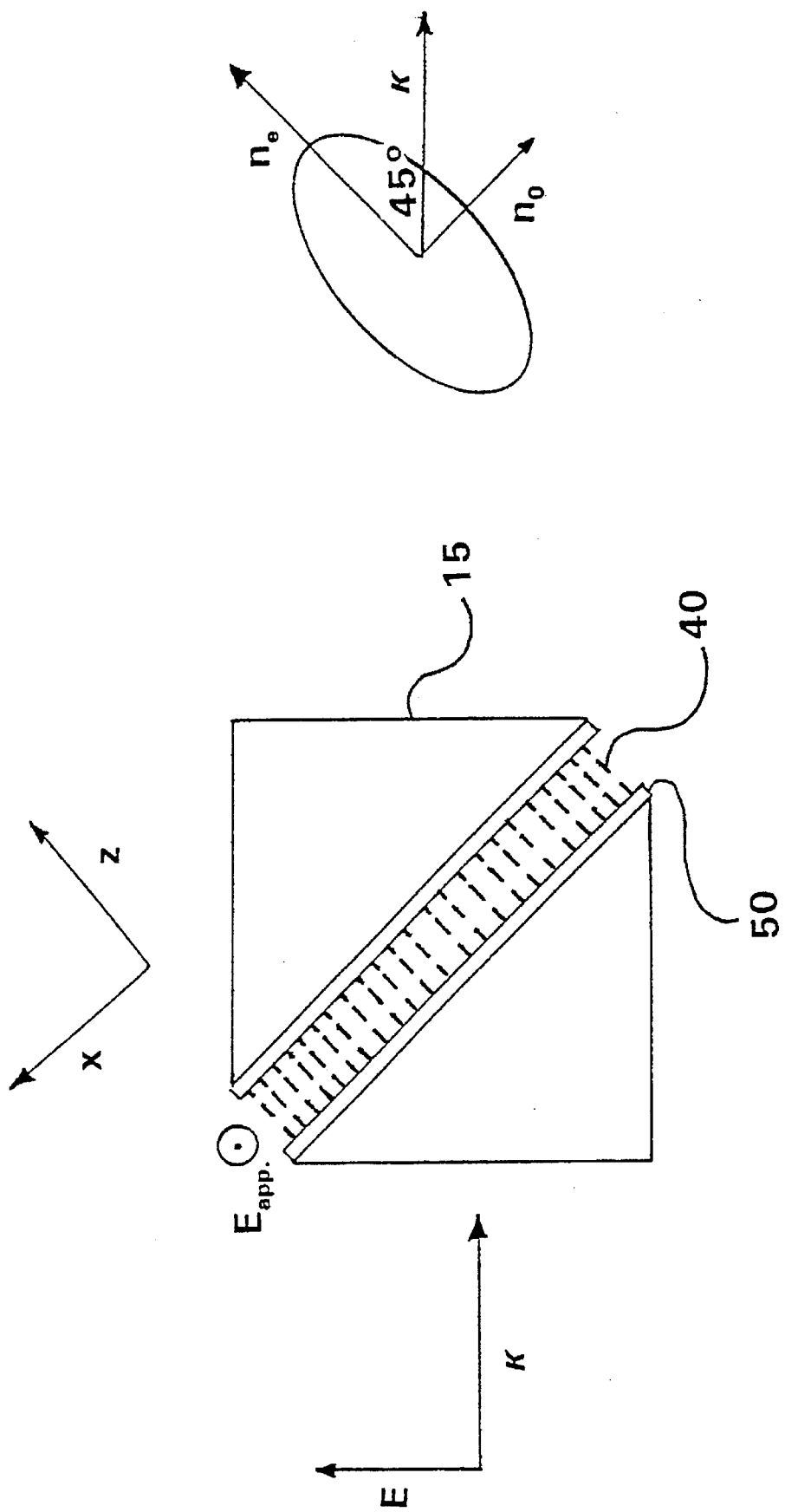
FIG. 7 is a homeotropically aligned lateral electrode cell utilizing two right angle prisms to provide a 45° angle of FIG. 8 illustrates the $SiO_x$ oblique evaporation technique incidence for fabricating tilted layer cells (FIG. 8a) and the resulting layer alignment (FIG. 8b).

In the homeotropically aligned oblique angle of incidence cells of this invention, the oblique angle can be provided by right angle prisms as shown in FIG. 7. Liquid crystal molecules 40 are homeotropically aligned between the inclined surfaces of prisms 15 using alignment layers 50. Light at normal incidence to the external prism surface propagates through the liquid crystal layers at approximately 45°. The exact angle is a function of the incident angle and the refractive indices of the prisms and the liquid crystal. The prism device of FIG. 7 is particularly suited for coupling with other optical elements which can abut the prism faces, and for cascading multiple liquid crystal cells. For pure phase modulation the polarization of incident light is in the plane of molecular rotation, the xz plane. At other polarization orientations, the device modulates both phase and polarization. Intensity modulation can be produced by using the device of FIG. 7 in combination with an analyzing polarizer at an angle to the incident polarization, or in combination with an entrance and an analyzing polarizer. In one embodiment, an entrance and crossed analyzing polarizer are employed and the plane of molecular rotation is at 45° to the polarizing axes of the polarizers.

Figure 3D:
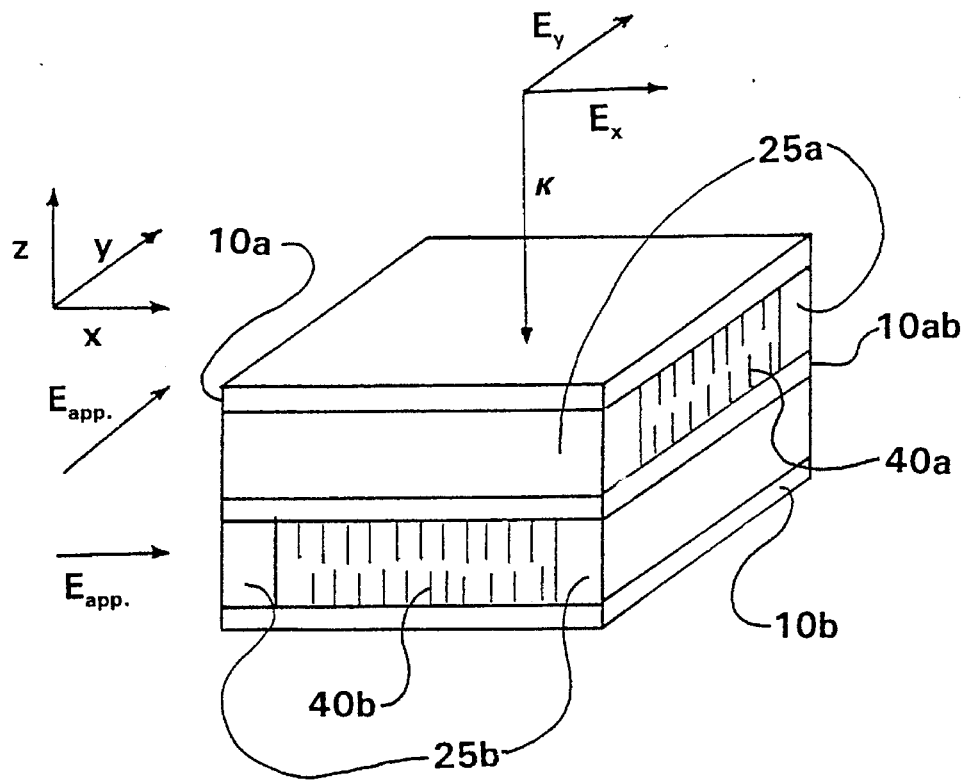
FIG. 3d is a two cell polarization independent modulator.

The homeotropically aligned phase modulator of this invention provides pure phase modulation for light at normal or oblique incidence polarized in the plane of the molecular rotation. Pure phase modulation for light of any elliptical polarization can be achieved by two phase modulators in series or parallel, with the electric fields of the two cells applied in orthogonal lateral directions. In an embodiment of the two cell modulator, the homeotropic modulator with an electric field in the y direction is combined in series with a second modulator which has electrodes configured to apply a field in the x direction as shown in FIG. 3d. The two cells can share substrate 10ab in common. The first cell, formed by substrates 10a and 10ab, electrodes 25a and liquid crystal 40a, provides variable retardation of the component of light polarized in the x direction and fixed retardation of the y component via $n_o$. The second cell, formed by substrates 10ab and 10b, electrodes 25b and liquid crystal 40b, provides variable retardation of the y component and fixed retardation of the x component. The total retardance of both components of the polarization is equal, and thus the two stage retarder of this invention provides pure phase modulation.

This invention provides an alternative to tilting the cell in order to increase the angle between the incident light and the molecular director. In the tilted layer lateral electrode cell of this invention the molecules are aligned in a tilted position with respect to the glass substrates by using a suitable surface treatment. Either the molecules can be pre-tilted within homeotropically aligned layers or the smectic layers can be tilted. This configuration may be considered more practical in most applications. In this configuration, increased modulation depth can be achieved at normal incidence of the optical beam, although the tilted layer device can also be used at oblique incidence.

The tilted layer device is illustrated in FIG. 4. As in the homeotropic structure, the electric field is applied parallel to the glass substrates with lateral electrodes. The modulator contains substrates 110, alignment layers 150, and liquid crystal molecules 140 in tilted layers 130. Lateral electrodes, not visible in this view, are provided to apply a field in the y direction. The substrate normal is in the plane of the molecular rotation.

Figure 8A:
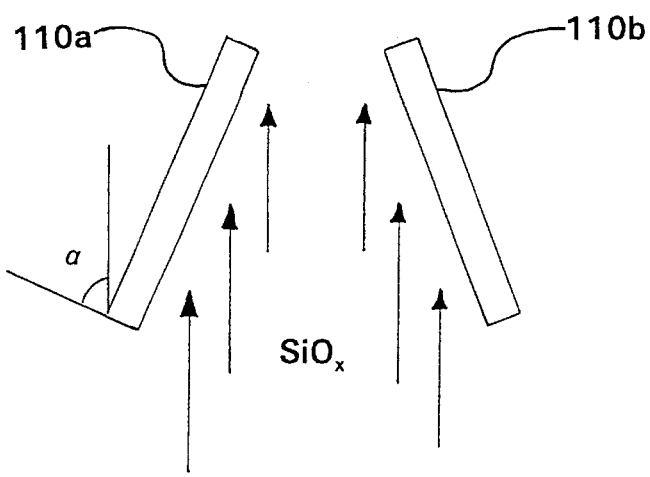
Figure 8B:
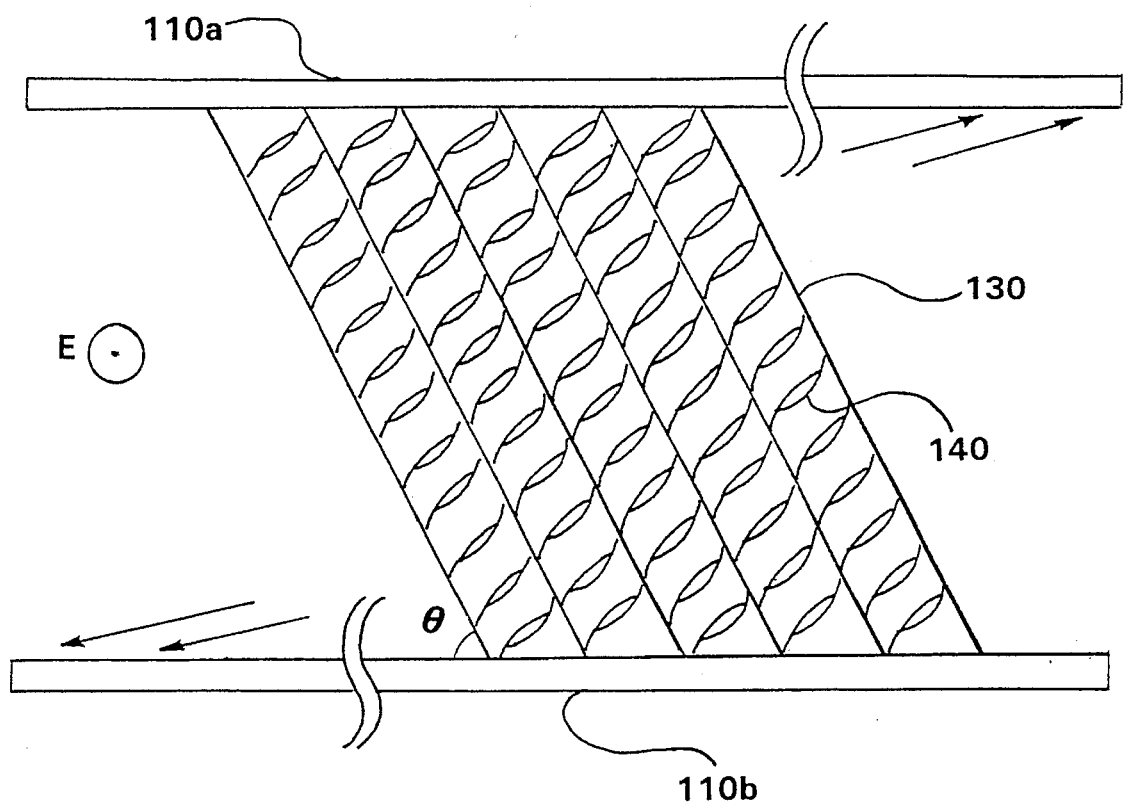

The tilted structure of the liquid crystal layers can be obtained by various techniques. Oblique evaporation of $SiO_x$, typically at an angle of 60°–80° to the substrate normal, has been shown to form array-like structures composed of parallel rows of tilted columns. The $SiO_x$ evaporation is illustrated in FIG. 8a. Substrates 110a and 110b are coated with $SiO_x$ deposited at angle α to the substrate normal. In the cell configuration (FIG. 8b), the two substrates are positioned anti-parallel, i.e., the tilted columns of $SiO_x$ were evaporated from opposite directions, as indicated by the arrows. The columnar structure of the $SiO_x$ forces the liquid crystal molecules 140 and the smectic layers 130 to align in a tilted orientation with the smectic layers at angle $\theta_0$ with respect to the substrates. Generally the tilt angle of the layers is less than the evaporation angle α. The tilt angle of the layers can be controlled by the evaporation angle and the alignment layer thickness to obtain the desired θ=45° pre-tilt angle.

Tilted layers can also be prepared using a two step technique: oblique evaporation of $SiO_x$ followed by spin-coating of surfactants, such as CTAB, which promote homeotropic alignment. The combined surface treatment produces tilted liquid crystal alignment similar to the single step $SiO_x$ evaporation technique.

Polyamide surface coating followed by rubbing treatment has also been shown to produce tilted smectic layer structures similar to those obtained with oblique evaporation of $SiO_x$. Pretilts of up to ~30° have been achieved with present commonly used materials.

As in the homeotropically aligned cell, the electrodes in the tilted layer cell can be prepared in several ways. The lateral electrodes can be thin layers which tilt the molecules via a fringing field, as in FIG. 1, or they can be thick layers which also serve as cell spacers, as in FIG. 3a. Electrodes can be prepared with patterned deposition or with deposition and patterned etching. An electroformed patterned foil can be applied to the cell as the electrodes. The alignment layer can be deposited on the electrodes or the electrodes can be positioned on top of the alignment layer. The electrodes can be a single pair, as illustrated, or can be a pattern such as interdigital electrodes. Multiple electrodes can be one or two dimensional.

The tilted layer aligned modulator of this invention produces pure phase modulation when the polarization of incident light is in the plane of the molecular rotation. As with the homeotropic alignment, two cells with orthogonal lateral electrodes can be combined in series or in parallel to provide pure phase modulation of elliptically polarized light. For other orientations of the polarization, it can also produce variable retardation resulting in complex amplitude modulation. An amplitude modulator is provided by placing the device between polarizers. In an embodiment of the amplitude modulator, the tilted layer cell is positioned between crossed polarizers and the plane of molecular rotation is at 45° to the polarizers.

Figure 9:
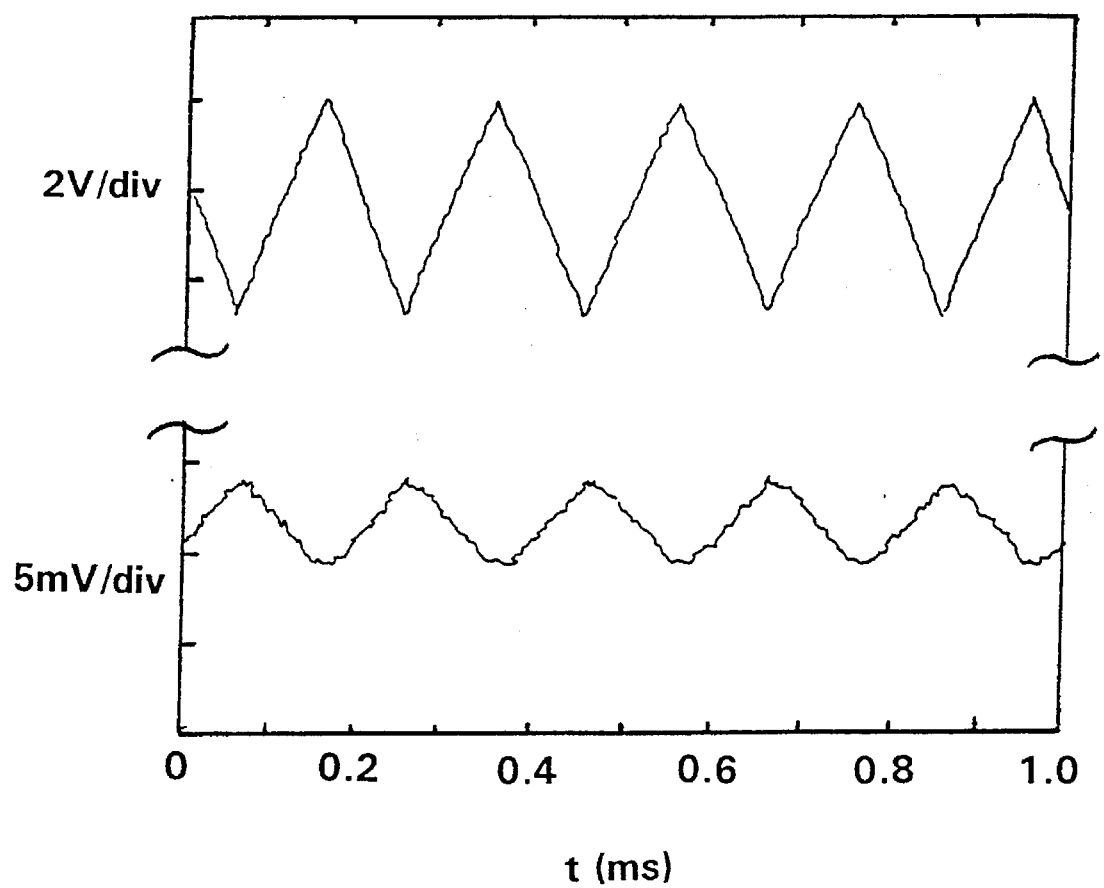
FIG. 9 is the analog optical response (lower trace) of a tilted layer SmA* cell to a modulating electric field signal (upper trace).

An exemplary tilted layer modulator of this invention was fabricated using oblique evaporation of $SiO_x$. The evaporation angle was α=80° and the plates were assembled in the anti-parallel $SiO_x$ evaporation direction. The liquid crystal was BDH764E in the SmA* phase and the measurements were made at room temperature. As in the measurements of the homeotropically aligned modulation, the device was placed between crossed polarizers to produce amplitude modulation. FIG. 9 shows the optical response to an analog applied field. The upper trace is the applied voltage and the lower trace is the analog response of the modulator.

This invention also includes lateral electrode liquid crystal cells in a Fabry-Perot resonator. In transmission-reflection mode the Fabry-Perot modulators of this invention produce modulation of the transmission at each wavelength for polychromatic light, and complex amplitude modulation for monochromatic light. In reflection-only mode, the asymmetric Fabry-Perot modulators of this invention produce phase-only modulation.

The Fabry-Perot tunable filter of this invention comprises a smectic liquid crystal lateral electrode cell in a cavity formed by two mirrors. When the reflectivity of the two mirrors is equal, the FP transmissions function is given by:

$$T = \frac{(1-R)^2}{(1-R)^2 + 4R\sin^2(\delta/2)} \qquad \text{Eq. 3}$$

where:

-continued $$\delta = \frac{4\pi n_e(\theta) l \cos\phi}{\lambda} \quad \text{Eq. 4}$$

is the phase accumulated in each round-trip inside the cavity. Here, $n_e$ is the extraordinary index of refraction of the material within the cavity, $l$ is the cavity length, $\phi$ is the refraction angle of the beam inside the cavity, $\lambda$ is the operating wavelength and R is the mirror reflectivity. The resonant wavelengths of this filter are determined by the phase $\delta$ given in Eq. 4. The passband width of the resonant peak is determined by the filter finesse, which is a function of the mirror reflectivity and cavity losses. Tuning the wavelengths that the filter transmits can be achieved by tuning the index of refraction of the cavity material.

Figure 10A:
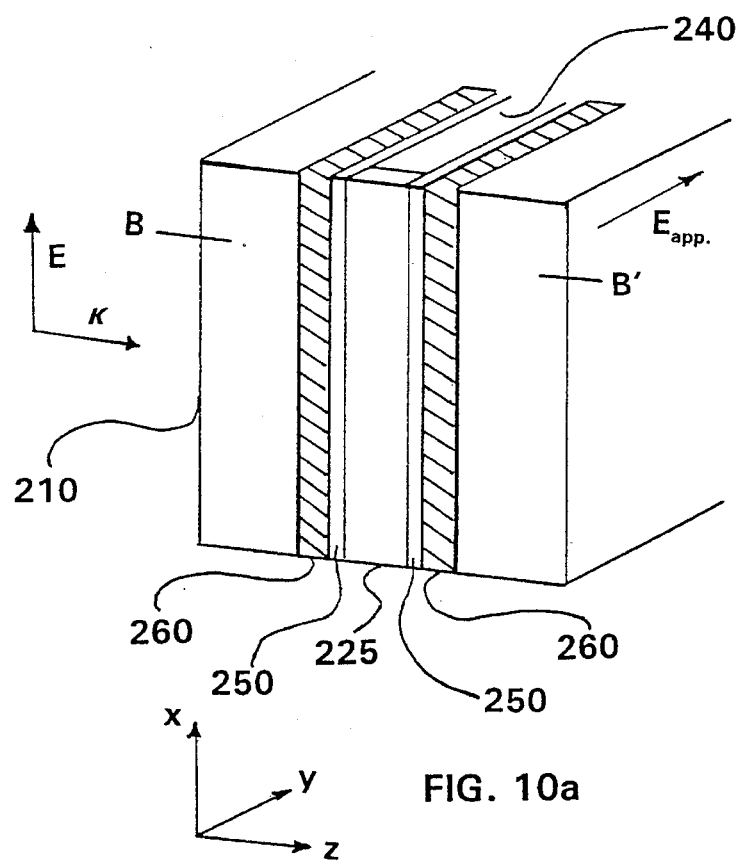
FIG. 10 is a lateral electrode cell within a Fabry-Perot cavity in side view (FIG. 10a) and top view (FIG. 10b).
Figure 10B:
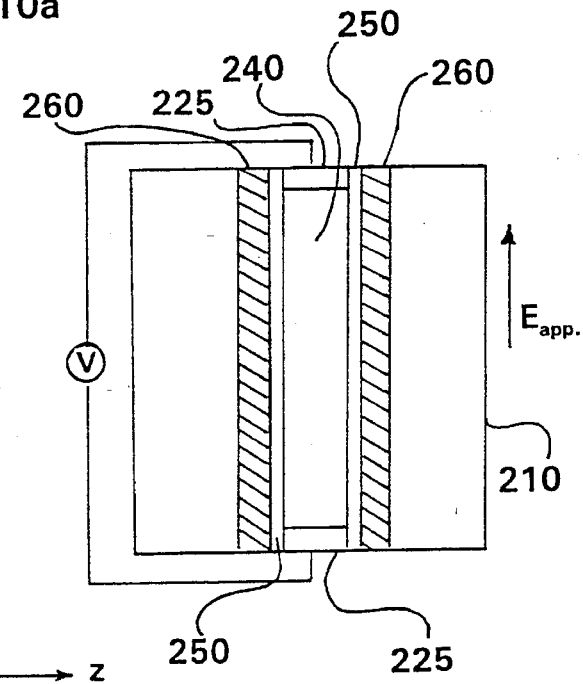

The Fabry-Perot tunable filter of this invention uses a lateral electrode smectic liquid crystal cell within the cavity. When the liquid crystal is in the SmA* phase, the filter provides analog wavelength, intensity and phase modulation with microsecond response times. The capability is not possible with surface stabilized parallel aligned cells or with nematic liquid crystal cells. The Fabry-Perot filter, illustrated in FIG. 10, comprises substrates 210, reflective surfaces 260, alignment layers 250, lateral electrodes 225, and smectic liquid crystal 240. The liquid crystal can be homeotropically aligned or tilted layer aligned. The cavity can also contain an additional isotropic spacer. The incident light can have any elliptical polarization.

When the reflectivity of both mirrors is less than 100%, the cavity operates in transmission-reflection mode. Light is incident on the front mirror and, depending on the cavity resonance condition, varying portions exit through the front and the back mirror. For polychromatic light, one wavelength or set of wavelengths is transmitted through the back mirror and the remaining wavelengths exit through the front mirror. For intensity modulation of monochromatic light, modulating the resonance conditions shifts the output light between the front and back mirrors. In an asymmetric Fabry-Perot cavity, the reflectivity of the back mirror approaches 100%. In this case the light enters and exits through the front mirror and the filter provides phase-only modulation.

The tuning range of this device is given by:

$$\Delta\lambda \cong \frac{\lambda}{n_e(\theta_o)} \Delta n_e(\theta) \quad \text{Eq. 5}$$

where $\theta_0$ is the angle of the layer tilt. For $n_e(\theta_0)=1.5$, $\lambda=1.55$ μm, $\theta_0=45°$ and $\Delta n_e=0.06$, the tuning range for this filter is 60 nm.

Figure 11:
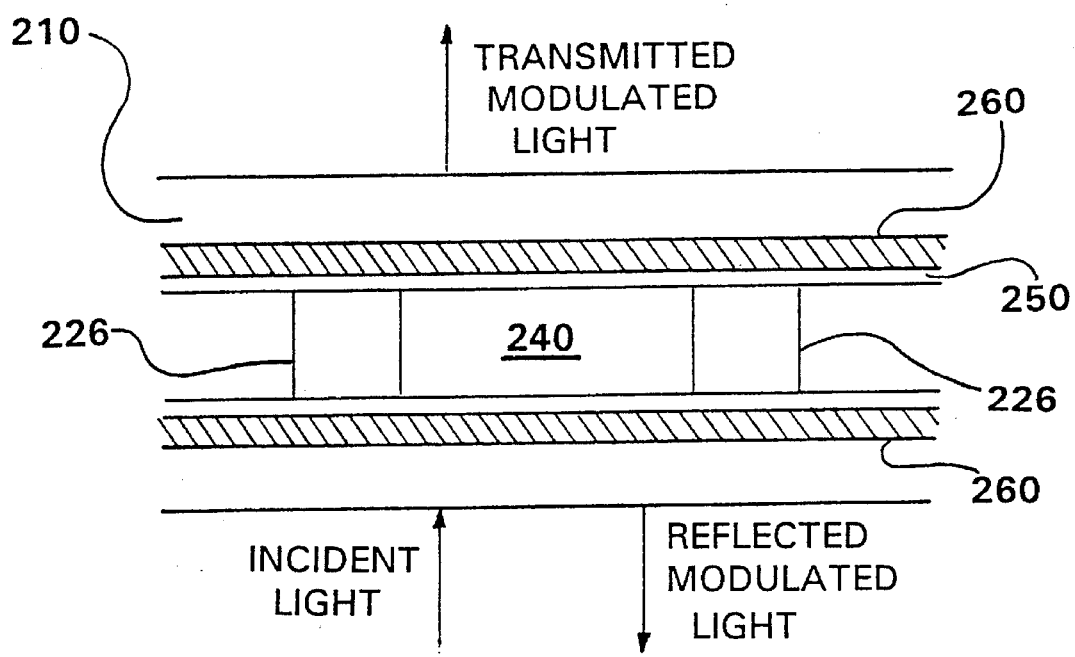
FIG. 11 is a pixel of a multipixel array comprising a lateral electrode cell within a Fabry-Perot cavity.

The Fabry-Perot filter of this invention can be used as a pixel in a multiple pixel array, as shown in FIG. 11. The multiple pixel device has a plurality of lateral electrodes 226 which define cells containing liquid crystals 240. The device is built on substrates 210 with mirrors 260 and alignment layers 250. In the illustrated embodiment the filter operates in transmission-reflection mode. The single pass lateral electrode modulators of this invention can likewise be used in multiple pixel arrays.

Figure 12A:
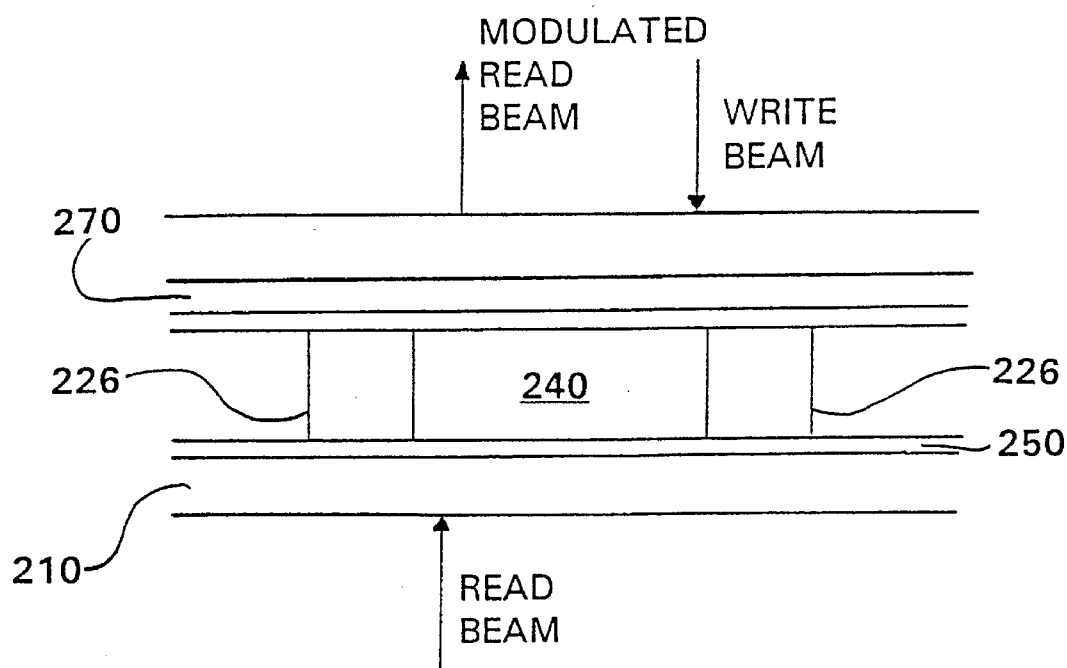
FIG. 12a is a single pass lateral electrode cell and FIG. 12b includes an asymmetric Fabry-Perot cavity.
Figure 12B:
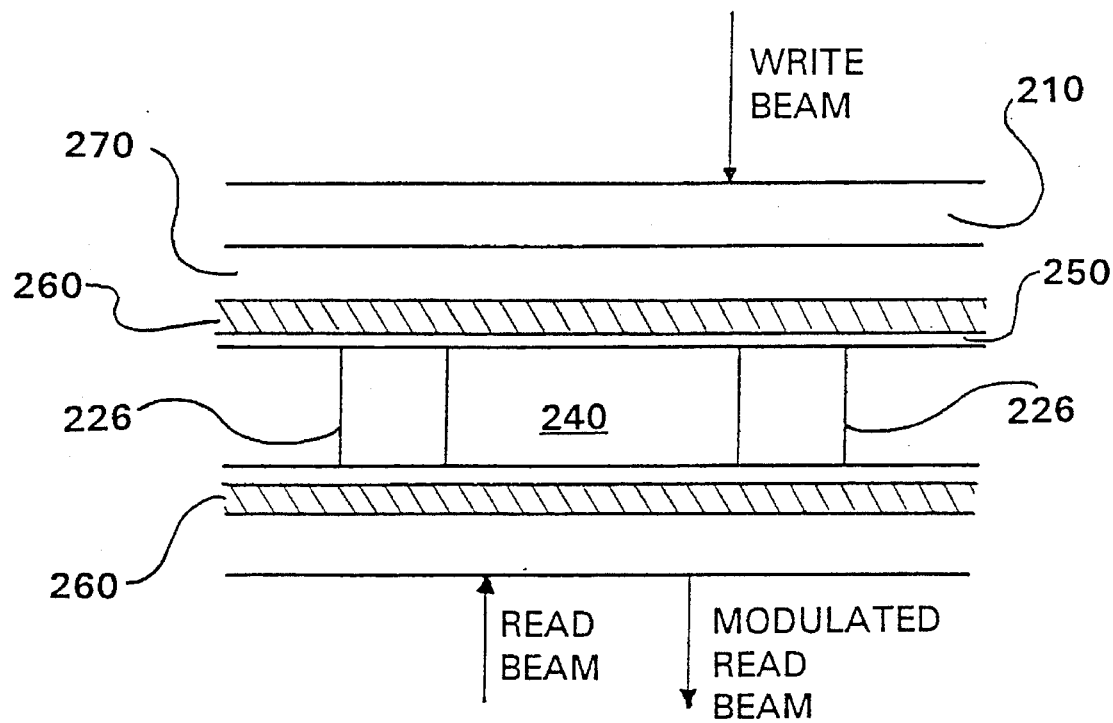
FIG. 12 shows exemplary applications of lateral electrode cells in optically addressable spatial light modulators.

The phase modulators and Fabry-Perot filters of this invention can be optically addressed, as shown for multiple pixel arrays in FIG. 12. FIG. 12a is the homeotropically or tilted layer aligned phase modulator of this invention with a photo-sensing layer 270. The photosensor is coupled with one of the lateral electrodes 226. In response to an optical signal or write beam, a voltage is applied to that electrode. The resulting refractive index change modulates the incident read beam. The photo-sensor can be a photovoltaic cell which provides the voltage or it can switch voltage from an external voltage source. FIG. 12b is the Fabry-Perot filter of this invention with a photo-sensing layer 270. In the illustrated embodiment, the Fabry-Perot filter operates in reflection-only mode.

Figure 13A:
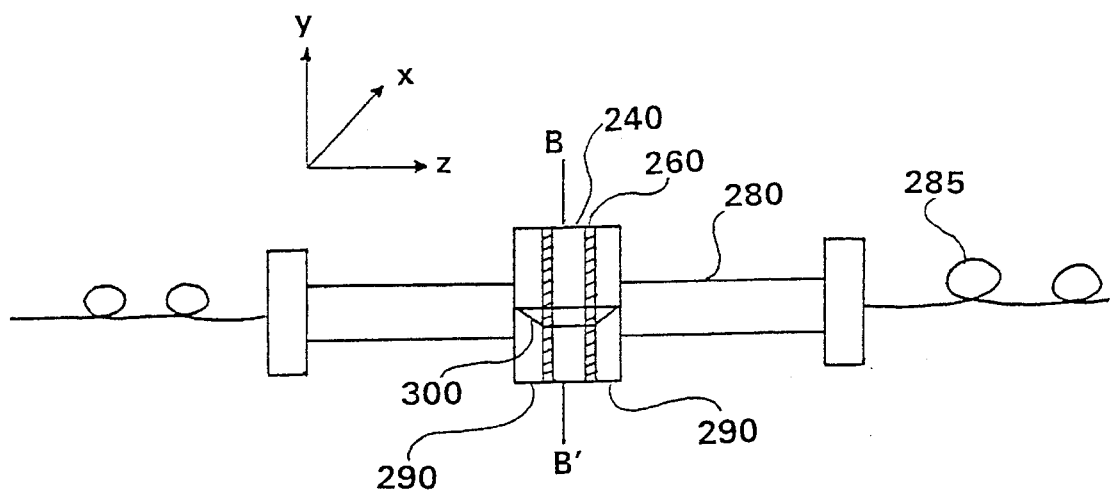
FIG. 13 is a polarization independent embodiment of a lateral electrode cell shown in side view (FIG. 13a) and cross section (FIG. 13b).
Figure 13B:
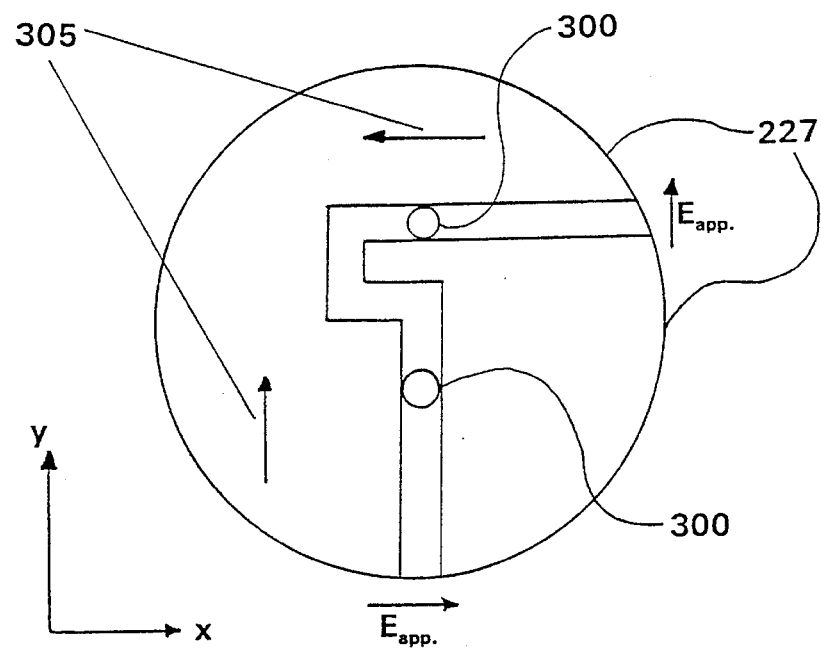

Both the lateral electrode liquid crystal cell modulators and the Fabry-Perot filters of this invention can be used in a polarization-diversity configuration. In this configuration, the light is divided into orthogonal polarizations, each component is modulated separately, and the light is recombined. The polarization-diversity tunable Fabry-Perot filter is shown in FIG. 13. Two fiber collimators 280 are used to couple the laser beam carried in fibers 285 with the filter. Birefringent crystals 290 are used to separate and recombine the x and y polarized modes of the light 300. Mirrors 260 are coated with patterned electrodes. The patterned electrodes 227 are shown in FIG. 13b. For each of the orthogonally polarized light beams 300, an electric field is applied to liquid crystal 240 orthogonal to the direction of polarization 305. This provides equal modulation for both polarizations. In the tilted layer embodiment of this device, the layers are tilted in orthogonal directions for modulation of the two polarizations. The two cell polarization independent modulator of FIG. 3d can also be placed within a Fabry-Perot cavity.

The electroclinic liquid crystal phase modulator of this invention can be incorporated in a wide variety of applications requiring analog, fast phase modulation. Examples include diffractive optics, optical interconnects and spatial light modulators (SLMs). In diffractive optics, real-time analog phase modulation is an important feature. The tunability of the phase enables reconfigurable, compact schemes that involve less interconnections hardware, and its analog nature yields higher diffraction efficiencies. Possible applications include adaptive Fresnel lenses, adjustable gratings, and beam steering. Optical interconnections are offered as a solution to the capacity problem of electronic interconnections, now approaching its fundamental limit due to increasing density of electronic components, in such applications as telecommunications and computer architectures. Fast analog phase modulators are suitable for reconfigurable interconnections, offering compactness, higher complexity interconnection schemes, and greater bandwidths. Phase modulating SLMs are required in many optical systems, having applications such as image processing and neural networks. Possible implementations are, for example, Fresnel lenslet arrays, and "smart" phase modulating pixel arrays.

Applications for the Fabry-Perot tunable filter include high speed networks, spectroscopy, and laser tuning. The use of optical fibers in telecommunication networks, optimized for operating at a wavelength of 1.55 μm, is increasingly realized as a technique which adds system capacity, provides longer communication links, and reduces system cost. In order to take advantage of this fiber capacity, a high speed, wide tuning range, inexpensive optical tunable filter is required. The electoclinic liquid crystal Fabry-Perot tunable filter has the required features for optimally exploiting the advantages of wavelength division multiplexing (WDM) photonic switching networks. It offers high switching speed (microseconds), large tuning range (50–100 nm), high resolution (sub-nanometer passband), and high throughput (close to 100% transmission). The electroclinic Fabry-Perot tunable filter can also be used as a spectroscopic tool for applications such as solar energy and atmospheric research, remote sensing and analytical chemistry. Incorporated inside an external cavity of a broad-band laser source such as a diode laser or erbium-doped fiber laser, the electroclinic CSLC Fabry-Perot tunable filter can tune the lasing wavelength over the entire laser gain bandwidth within microseconds.

This invention is a homeotropically aligned or tilted layer aligned lateral electrode liquid crystal modulator and devices, including Fabry-Perot devices utilizing the modulator. The foregoing illustrative examples do not limit the embodiments which fall within the spirit and scope of this invention. For example, although the devices demonstrated above use SmA* liquid crystal, the devices can also be constructed with SmC*, DHF, and antiferroelectric liquid crystals. The retarders of this invention have been illustrated in Fabry-Perot filters. They can also be used singly and in multiple stages as the variable retarder element in other electro-optic modulators known in the art. The substrate material, the electrode material and configuration, the spacer method, the alignment technique, and the liquid crystal material can be widely varied. Light can be coupled to the devices using refractive, diffractive, and gradient index (GRIN) lensing systems or fiber coupling. These and other variations and applications of this invention will be readily apparent to those skilled in the art.

We claim:

1. A tilted layer liquid crystal cell for light modulation comprising:

a pair of substrates positioned with opposing surfaces spaced apart to form cell walls;

a smectic liquid crystal with rotatable optic axis disposed between said cell walls, the layers of said liquid crystal at an oblique angle, $\Theta$, to said cell walls; and a means for applying an electric field parallel to said cell walls through said liquid crystal to rotate said optic axis of said liquid crystal;

wherein the light is transmitted through said liquid crystal.

2. The tilted layer cell of claim 1 further comprising an alignment layer on each of said cell walls.

3. The tilted layer cell of claim 2 wherein each of said alignment layers comprise obliquely deposited $SiO_x$.

4. The tilted layer cell of claim 3 wherein each of said alignment layers further comprises a homeotropic alignment agent coated on said $SiO_x$.

5. The tilted layer cell of claim 2 wherein $\Theta$ is greater than 30° and less than 60°.

6. The tilted layer cell of claim 5 wherein $\Theta$ is approximately 45°.

7. The tilted layer cell of claim 5 wherein said liquid crystal is a SmA* liquid crystal and wherein said alignment layers comprise obliquely deposited $SiO_x$ and a homeotropic alignment agent coated on said $SiO_x$.

8. The tilted layer cell of claim 1 wherein said electric field is both parallel to said cell walls and parallel to the smectic layers of said liquid crystal.

9. The tilted layer cell of claim 1 wherein said liquid crystal is selected from the group consisting of SmA*, SmC*, DHF, achiral ferroelectric and antiferroelectric liquid crystals.

10. The tilted layer cell of claim 1 wherein said liquid crystal is a SmA* liquid crystal.

11. The tilted layer cell of claim 1 wherein said means for applying an electric field comprises two electrodes disposed, laterally about said liquid crystal.

12. The tilted layer cell of claim 11 wherein said electrodes further provide a means for spacing apart said substrates.

13. The tilted layer cell of claim 1 disposed as a pixel in a multipixel array of modulators.

14. The tilted layer cell of claim 1 wherein said light is incident on said cell at substantially normal incidence.

15. The tilted layer cell of claim 1 wherein rotating said optic axis modulates the extraordinary index of refraction of said liquid crystal.

16. The tilted layer cell of claim 15 wherein modulating said extraordinary index of refraction modulates the phase of light transmitted through said liquid crystal.

17. The tilted layer cell of claim 1 wherein said cell is a variable retarder.

18. A method of phase modulation of light utilizing the tilted layer cell of claim 1 and comprising the steps of:

impinging light on the tilted layer cell of claim 1; and applying an electric field to said cell, whereby the phase of said light is modulated.

19. The method of phase modulation of claim 18 wherein said light impinges at substantially normal incidence.

20. The method of phase modulation of claim 18 wherein said impinging light is linearly polarized and wherein the polarization vector is in the plane of rotation of said optic axis of said liquid crystal.

21. A Fabry-Perot modulator for light comprising:

a first liquid crystal cell comprising a pair of substrates with opposing surfaces spaced apart to form cell walls, a smectic liquid crystal disposed between said cell walls, and a means for applying an electric field parallel to said cell walls through said liquid crystal; and a front and a back reflective means positioned in series with and on either side of said liquid crystal to form a Fabry-Perot cavity.

22. The Fabry-Perot modulator of claim 21 wherein said liquid crystal is a homeotropically aligned liquid crystal.

23. The Fabry-Perot modulator of claim 21 wherein said liquid crystal is a tilted layer aligned liquid crystal having the layers of said liquid crystals at an oblique angle to said cell walls.

24. The Fabry-Perot modulator of claim 23 wherein said liquid crystal is a SmA* liquid crystal.

25. The Fabry-Perot modulator of claim 24 wherein said liquid crystal cell further includes an alignment layer on each of said cell walls, each of said alignment layers comprising obliquely deposited $SiO_x$.

26. The Fabry-Perot modulator of claim 25 wherein each of said alignment layers further comprises a homeotropic alignment agent coated on said $SiO_x$.

27. The Fabry-Perot modulator of claim 21 wherein said liquid crystal is selected from the group consisting of SmA*, SmC*, DHF, achiral ferroelectric and antiferroelectric liquid crystals.

28. The Fabry-Perot modulator of claim 21 wherein said liquid crystal is a SmA* liquid crystal.

29. The Fabry-Perot modulator of claim 21 wherein the reflectivities of said front and back reflective means are such that the modulator operates in transmission-reflection mode.

30. The Fabry-Perot modulator of claim 21 wherein the reflectivities of said front and back reflective means are such that the modulator operates in reflection-only mode.

31. The Fabry-Perot modulator of claim 21 further including an isotropic spacer positioned between said front and back reflective means.

32. The Fabry-Perot modulator of claim 21 adapted for use with an optical addressing signal and further comprising a photosensing means, optically coupled with said addressing signal and electrically connected with said electric field applying means, for varying the applied electric field in response to said addressing signal.

33. The Fabry-Perot modulator of claim 21 disposed as a pixel in a multipixel array of Fabry-Perot modulators.

34. The Fabry-Perot modulator of claim 21 further comprising a second liquid crystal cell, positioned in series with said first liquid crystal cell and between said front and back reflective means, comprising a pair of substrates with opposing surfaces spaced apart to form cell walls, a smectic liquid crystal disposed between said cell walls, and a means for applying an electric field parallel to said cell walls through said liquid crystal, wherein the electric field in said second liquid crystal cell is orthogonal to the electric field in said first liquid crystal cell.

35. The Fabry-Perot modulator of claim 34 wherein said first and second liquid crystal cells have equal magnitude retardances.

36. The Fabry-Perot modulator of claim 34 further comprising:

a second liquid crystal cell, positioned in parallel with said first liquid crystal cell and between said front and back reflective means, comprising a pair of substrates with opposing surfaces spaced apart to form cell walls, a smectic liquid crystal disposed between said cell walls, and a means for applying an electric field parallel to said cell walls through said liquid crystal, wherein the electric field in said second liquid crystal cell is orthogonal to the electric field in said first liquid crystal cell.

a means for spatially dividing said light into a first and a second component of orthogonal polarization and for coupling said first component into said first liquid crystal cell and said second component into said second liquid crystal cell; and a means for receiving and for recombining light from said first and said second liquid crystal cells.

37. The Fabry-Perot modulator of claim 36 wherein said first and second liquid crystal cells have equal magnitude retardances.

38. The Fabry-Perot modulator of claim 21 wherein said light is incident on said front reflective means at substantially normal incidence.

39. The Fabry-Perot modulator of claim 21 wherein applying said electric field rotates the optic axis of said liquid crystal.

40. The Fabry-Perot modulator of claim 39 wherein rotating said optic axis modulates the extraordinary index of refraction of said liquid crystal.

41. The Fabry-Perot modulator of claim 40 wherein modulating said extraordinary index of refraction modulates the phase of light transmitted through said liquid crystal.

42. A prism-coupled modulator for light comprising:

a first and a second substrate positioned with opposing surfaces spaced apart to form cell walls;

a smectic liquid crystal with rotatable optic axis disposed between said cell walls;

a means for applying an electric field parallel to said cell walls through said liquid crystal to rotate said optic axis of said liquid crystal; and an input prism for receiving said light and for optically coupling the received light with said first substrate at an angle oblique to said first substrate, wherein said received light is transmitted through said liquid crystal.

43. The prism-coupled modulator of claim 42 further including an output prism for receiving the transmitted light from said second substrate and for outputting said transmitted light at an angle oblique to said second substrate.

44. The prism-coupled modulator of claim 43 wherein said input and output prisms are right angle prisms positioned with hypotenuse faces facing said first and second substrates, respectively.

45. The prism-coupled modulator of claim 44 wherein said input and output prisms further function as said first and second substrates, respectively.

46. The prism-coupled modulator of claim 42 wherein said liquid crystal is a homeotropically aligned liquid crystal.

47. The prism-coupled modulator of claim 42 wherein said liquid crystal is a tilted layer aligned liquid crystal having the layers of said liquid crystals at an oblique angle to said cell walls.

48. The prism-coupled modulator of claim 42 wherein rotating said optic axis modulates the extraordinary index of refraction of said liquid crystal.

49. The prism-coupled modulator of claim 48 wherein modulating said extraordinary index of refraction modulates the phase of light transmitted through said liquid crystal.

50. A series polarization independent modulator of light comprising:

a first smectic liquid crystal cell for variably retarding a first polarization of light; and a second smectic liquid crystal cell, positioned in series with said first cell, for variably retarding a second polarization of light, said second polarization orthogonal to said first linear polarization;

wherein each of said liquid crystal cells comprises a pair of substrates with opposing surfaces spaced apart to form cell walls, a smectic liquid crystal layer with rotatable optic axis disposed between said cell walls, and a means for applying an electric field parallel to said cell walls through said liquid crystal layer; and wherein said electric field in said first liquid crystal cell is orthogonal to said electric field in said second liquid crystal cell.

51. The series polarization independent modulator of claim 50 wherein said liquid crystal in said first and second liquid crystal cells is homeotropically aligned.

52. The series polarization independent modulator of claim 50 wherein said liquid crystals in said first and second liquid crystal cells are tilted layer aligned liquid crystals having the layers of said liquid crystals in each of said cells at an oblique angle to said cell walls, and wherein the smectic layers in each cell are parallel to the electric-field in that cell.

53. The series polarization independent modulator of claim 50 wherein said liquid crystal in said first and second liquid crystal cells is a SmA* liquid crystal.

54. The series polarization independent modulator of claim 50 wherein said first and second liquid crystal cells have equal magnitude retardances.

55. The series polarization independent modulator of claim 50 wherein said first and said second liquid crystal cells share one substrate in common, such that said series polarization independent modulator comprises three substrates in series.

56. The series polarization independent modulator of claim 55 wherein said liquid crystal in said first and second liquid crystal cells is a tilted layer aligned SmA* liquid crystal having the layers of said liquid crystals at oblique angles to said cell walls, and wherein the smectic layers of each cell are parallel to the electric field in that cell.

57. The series polarization independent modulator of claim 50 further comprising a first and a second reflective means forming a Fabry-Perot cavity containing said liquid crystal layers in said first and second liquid crystal cells.

58. A parallel polarization diversity modulator for light comprising:

a means for spatially dividing said light into a first and a second component of orthogonal polarization;

a first liquid crystal cell optically coupled with said first component of light;

a second liquid crystal cell optically coupled with said second component of light; and a means for recombining said first and said second component of light;

each of said first and second liquid crystal cells comprising a pair of substrates with opposing surfaces spaced apart to form cell walls, a smectic liquid crystal disposed between said cell walls, and a means for applying an electric field parallel to said cell walls through said liquid crystal; and wherein said electric field in said first liquid crystal cell is orthogonal to said electric field in said second liquid crystal cell.

59. The parallel polarization diversity modulator of claim 58 wherein said first and said second liquid crystal cells have equal magnitude retardances.

60. The parallel polarization diversity modulator of claim 58 wherein said liquid crystals in said first and said second liquid crystal cells are homeotropically aligned.

61. The parallel polarization diversity modulator of claim 58 wherein said liquid crystals in said first and said second liquid crystal cells are tilted layer aligned having the layers of said liquid crystals in each of said cells at an oblique angle to said cell walls, and wherein the smectic layers of each cell are parallel to the electric field in that cell.

62. The parallel polarization diversity modulator of claim 58 adapted for use with an optical fiber and further including a means for optically coupling said modulator with said fiber.

63. The parallel polarization diversity modulator of claim 58 wherein each of said first and second liquid crystal cells further includes a first and a second reflective means positioned in series with and on either side of said liquid crystal to form a Fabry-Perot cavity containing said liquid crystal.

64. The parallel polarization diversity modulator of claim 63 adapted for use with an optical fiber and further including a means for optically coupling said modulator with said fiber.

65. The parallel polarization diversity modulator of claim 64 wherein said liquid crystals in said first and said second liquid crystal cells are tilted layer aligned having the layers of said liquid crystals at oblique angles to said cell walls, and wherein the smectic layers of each cell are parallel to the electric field in that cell.

66. The parallel polarization diversity modulator of claim 58 wherein said liquid crystal is selected from the group consisting of SmA*, SmC*, DHF, achiral ferroelectric and antiferroelectric liquid crystals.

67. The parallel polarization diversity modulator of claim 58 wherein said liquid crystal is a SmA* liquid crystal.

68. The parallel polarization diversity modulator of claim 58 wherein said first and second liquid crystal cells share both substrates in common.

69. The parallel polarization diversity modulator of claim 68 wherein said means for dividing light and said means for recombining light comprise birefringent crystals and wherein said birefringent crystals form said substrates.

70. The parallel polarization diversity modulator of claim 69 adapted for use with an optical fiber and further including a means for optically coupling said modulator with said fiber.

71. An edge-entering liquid crystal modulator for light comprising a pair of substrates with opposing surfaces spaced apart to form cell walls, a smectic liquid crystal disposed between said cell walls, and a means for applying an electric field to said liquid crystal, wherein said modulator is adapted to receive light incident on the edge of said modulator between said substrates, and wherein the application of said electric field causes phase modulation of light transmitted through said modulator.

72. The edge-entering modulator of claim 71 wherein said means for applying an electric field comprises lateral electrodes for applying an electric field parallel to said cell walls.

73. The edge-entering modulator of claim 72 wherein said liquid crystal is a homeotropically aligned liquid crystal.

74. The edge-entering modulator of claim 72 wherein said liquid crystal is a tilted layer aligned liquid crystal having the layers of said liquid crystal at an oblique angle to said cell walls.

75. The edge-entering modulator of claim 71 wherein said means for applying an electric field comprises planar electrodes for applying an electric field normal to said cell walls.

76. The edge-entering modulator of claim 75 wherein said liquid crystal is a planar aligned liquid crystal.

77. The edge-entering modulator of claim 71 further including a second liquid crystal modulator positioned in series with said edge-entering modulator, said second modulator comprising a pair of substrates with opposing surfaces spaced apart to form cell walls, a smectic liquid crystal disposed between said cell walls, and a means for applying an electric field to said liquid crystal.

78. The edge-entering modulator of claim 77 wherein the electric field in said second modulator is applied orthogonal to the electric field in said edge-entering modulator.

79. The edge-entering modulator of claim 77 wherein said second modulator is oriented to receive light incident on the edge of said second modulator between said substrates.

80. The edge entering modulator of claim 77 wherein said second modulator is oriented to receive light through said cell walls.

81. A method of phase modulation of linearly polarized light comprising the steps of:

providing a liquid crystal cell comprising:
a pair of substrates positioned with opposing surfaces spaced apart to form cell walls;
a homeotropically aligned smectic liquid crystal with rotatable optic axis disposed between said opposing surfaces, said liquid crystal having a plane of electric field-induced rotation; and
a means for applying an electric field parallel to said opposing surfaces across said liquid crystal to rotate said optic axis of said liquid crystal;

orienting said cell to receive the incident light with the normal to said substrates at an angle $\Theta$ to the propagation vector of said incident light and with said plane of rotation of said liquid crystal parallel to the polarization of said incident light; and applying an electric field across said liquid crystal, whereby the phase of said incident light is modulated.

82. The method of phase modulation of claim 81 wherein said liquid crystal is selected from the group consisting of SmA*, SmC*, DHF, achiral ferroelectric and antiferroelectric liquid crystals.

83. The method of phase modulation of claim 81 wherein said liquid crystal is a SmA* liquid crystal.

84. The method of phase modulation of claim 81 wherein $\Theta=0°$.

85. The method of phase modulation of claim 81 wherein $\Theta$ is greater than 0°.

86. The method of phase modulation of claim 81 wherein $\Theta$ is greater than 30° and less than 60°.

\* \* \* \* \*